US012772085B2

(12) United States Patent
Yu et al.

(10) Patent No.: US 12,772,085 B2
(45) Date of Patent: Oct. 20, 2026

(54) METHOD FOR DETERMINING CELL QUALITY INFORMATION AND APPARATUS

(71) Applicant: Huawei Technologies Co., Ltd., Shenzhen (CN)

(72) Inventors: Haifeng Yu, Beijing (CN); Lei Chen, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 687 days.

(21) Appl. No.: 17/933,294

(22) Filed: Sep. 19, 2022

(65) Prior Publication Data

US 2023/0013657 A1 Jan. 19, 2023

Related U.S. Application Data

(63) Continuation of application No. PCT/CN2020/080494, filed on Mar. 20, 2020.

(51) Int. Cl.
*H04W 24/10* (2009.01)

(52) U.S. Cl.
CPC .................................. *H04W 24/10* (2013.01)

(58) Field of Classification Search
CPC .................................................... H04W 24/10
See application file for complete search history.

(56) References Cited

U.S. PATENT DOCUMENTS

2020/0053583 A1* 2/2020 Määttänen ............ H04W 24/10
2020/0288503 A1* 9/2020 Sahlin ................ H04B 7/06968
2020/0314673 A1* 10/2020 Deogun ............ H04W 56/0005
2021/0243768 A1* 8/2021 Thomas ................. H04B 7/088
2021/0297135 A1* 9/2021 Kim ..................... H04B 7/0626
2021/0307078 A1* 9/2021 Singh .................... H04L 5/0048
2022/0015020 A1* 1/2022 Määttänen ............ H04W 48/00
2022/0070800 A1* 3/2022 Woo ..................... H04B 7/0874

(Continued)

FOREIGN PATENT DOCUMENTS

CN 110114998 A 8/2019
CN 110809894 A 2/2020
WO 2018199074 A1 11/2018

(Continued)

OTHER PUBLICATIONS

3rd Generation Partnership Project; Technical Specification Group Radio Access Network; NR; NR and NG-RAN Overall Description; Stage 2 (Release 16), 3GPP TS 38.300, 101 Pages, Dec. 2019, V16.0.0.

(Continued)

*Primary Examiner* — Sujoy K Kundu
*Assistant Examiner* — Andrew Chanul Kim
(74) *Attorney, Agent, or Firm* — Slater Matsil, LLP

(57) ABSTRACT

A method for determining cell quality information and an apparatus are provided. The method includes: A terminal device receives first information from a first network device, where the first information indicates that a first cell is associated with a first SSB and a second SSB, and frequency information of the first SSB is different from frequency information of the second SSB; and the terminal device determines quality information of the first cell based on a measurement value of the first SSB and a measurement value of the second SSB.

20 Claims, 10 Drawing Sheets

(56) References Cited

U.S. PATENT DOCUMENTS

| | | | | |
|---|---|---|---|---|
| 2022/0232496 | A1* | 7/2022 | Kim | H04L 5/0053 |
| 2023/0164714 | A1* | 5/2023 | Kim | H04J 11/0073 |

FOREIGN PATENT DOCUMENTS

| | | | |
|---|---|---|---|
| WO | 2019029597 | A1 | 2/2019 |
| WO | 2019096398 | A1 | 5/2019 |
| WO | 2019203324 | A1 | 10/2019 |

OTHER PUBLICATIONS

3rd Generation Partnership Project; Technical Specification Group Radio Access Network; NR; Radio Resource Control (RRC) protocol specification (Release 15), 3GPP TS 38.331, 532 Pages, Dec. 2019, V15.8.0.

Media Tek Inc., "RRC Configuration for NR-ARFCN and GSCN", 3GPP TSG-RAN WG2 Meeting AH-1801, R2-1800649, 15 Pages, Jan. 22-26, 2018, Vancouver, Canada.

* cited by examiner

METHOD FOR DETERMINING CELL QUALITY INFORMATION AND APPARATUS

CROSS-REFERENCE TO RELATED APPLICATIONS

This application is a continuation of International Application No. PCT/CN2020/080494, filed on Mar. 20, 2020, the disclosure of which is hereby incorporated by reference in its entirety.

TECHNICAL FIELD

This application relates to the field of wireless communication technologies, and in particular, to a method for determining cell quality information and an apparatus.

BACKGROUND

In a 5th generation (5G) communication system, a terminal device may receive a synchronization signal and a synchronization signal and PBCH block (SSB) to synchronize with a network device, obtain a system message, and the like. A primary synchronization signal (PSS), a secondary synchronization signal (SSS), and a physical broadcast channel (PBCH) constitute an SSB. Further, the network device may send SSBs by using different beams at one frequency at different time domain positions. In this manner, because the network device needs to open a transmit channel at each time domain position, energy consumption of the network device is high.

To reduce the energy consumption of the network device, an energy saving solution is currently introduced. To be specific, the network device sends SSBs at a plurality of frequencies in frequency domain, so that time for which the network device needs to open a transmit channel is reduced, and energy is saved. However, in this manner, how the terminal device determines cell quality information still needs to be further studied.

SUMMARY

This application provides a method for determining cell quality information and an apparatus, to improve accuracy of determining cell quality information.

According to a first aspect, an embodiment of this application provides a method for determining cell quality information. The method may be applied to a terminal device, or may be applied to a chip in a terminal device. An example in which the method is applied to a terminal device is used. In this method, the terminal device receives first information from a first network device, where the first information indicates that a first cell is associated with a first SSB and a second SSB, and frequency information of the first SSB is different from frequency information of the second SSB; and the terminal device determines quality information of the first cell based on a measurement value of the first SSB and a measurement value of the second SSB.

In this manner, after learning, based on the first information sent by the first network device, that the first cell is associated with the two SSBs, the terminal device may determine the quality information of the first cell by comprehensively considering the measurement values of the two SSBs, so that accuracy of determining the cell quality information can be effectively improved.

In a possible design, the quality information of the first cell is determined based on the measurement value of the first SSB, the measurement value of the second SSB, and an auxiliary parameter, and the auxiliary parameter is obtained from the first network device; and the auxiliary parameter includes a preset threshold, a coefficient of the measurement value of the first SSB, and a coefficient of the measurement value of the second SSB.

In a possible design, that the quality information of the first cell is determined based on the measurement value of the first SSB, the measurement value of the second SSB, and an auxiliary parameter includes: If both the measurement value of the first SSB and the measurement value of the second SSB are greater than or equal to the preset threshold, the quality information of the first cell is determined based on the coefficient of the measurement value of the first SSB, the coefficient of the measurement value of the second SSB, the measurement value of the first SSB, and the measurement value of the second SSB; or if the measurement value of the first SSB or the measurement value of the second SSB is less than the preset threshold, the quality information of the first cell is determined based on a largest measurement value in the measurement value of the first SSB and the measurement value of the second SSB.

In a possible design, the method further includes: receiving second information from a second network device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible design, the method further includes: receiving third information from the second network device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible design, the method further includes: after determining the first SSB as a serving SSB, determining the frequency domain reference point based on the first offset and the third offset; or after determining the second SSB as a serving SSB, determining the frequency domain reference point based on the second offset and the fourth offset.

In this manner, when one cell is associated with two SSBs, the terminal device may obtain, from the network device, a frequency domain offset corresponding to frequency information of each SSB, so that after determining the serving SSB, the terminal device can accurately determine the frequency domain reference point based on the frequency domain offset corresponding to the frequency information of the serving SSB. This prevents an error from occurring in subsequent resource allocation of the network device.

In a possible design, the first cell is a cell on which the terminal device camps; or the first cell is a neighboring cell of a cell on which the terminal device camps.

In a possible design, the first information includes one or more association relationship identifiers and frequency information of an SSB corresponding to each association relationship identifier, where frequency information of the first SSB and frequency information of the second SSB correspond to a same association relationship identifier.

In a possible design, the first information is carried in a system message from the first network device.

In a possible design, the first cell is a cell accessed by the terminal device; or the first cell is a neighboring cell of a cell accessed by the terminal device.

In a possible design, the first information is carried in an RRC reconfiguration message or an RRC resume message from the first network device.

In a possible design, the RRC reconfiguration message or the RRC resume message further includes a measurement event identifier; and the method further includes: if determining that the quality information of the first cell meets a reporting condition corresponding to the measurement event identifier, reporting the quality information of the first cell to the first network device.

In a possible design, the first information includes frequency information of the first SSB associated with the first cell and frequency information of the second SSB associated with the first cell.

According to a second aspect, an embodiment of this application provides a method for determining cell quality information. The method may be applied to a network device, or may be applied to a chip in a network device. An example in which the method is applied to a network device is used. In this method, the network device determines first information, where the first information indicates that a first cell is associated with a first SSB and a second SSB, and frequency information of the first SSB is different from frequency information of the second SSB; and the network device sends first information to a terminal device, where the first information is used to determine quality information of the first cell.

In this manner, the network device indicates, to the terminal device, that the first cell is associated with the first SSB and the second SSB, so that the terminal device can determine the quality information of the first cell by comprehensively considering the measurement values of the two SSBs, and accuracy of determining the cell quality information can be effectively improved.

In a possible design, the method further includes: sending second information to the terminal device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible design, the method further includes: sending third information to the terminal device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible design, the first cell is a cell on which the terminal device camps; or the first cell is a neighboring cell of a cell on which the terminal device camps.

In a possible design, the first information includes one or more association relationship identifiers and frequency information of an SSB corresponding to each association relationship identifier, where frequency information of the first SSB and frequency information of the second SSB correspond to a same association relationship identifier.

In a possible design, the first information is carried in a system message from the first network device.

In a possible design, the first cell is a cell accessed by the terminal device; or the first cell is a neighboring cell of a cell accessed by the terminal device.

In a possible design, the first information is carried in an RRC reconfiguration message or an RRC connection resume message from the first network device.

In a possible design, the RRC reconfiguration message or the RRC connection resume message further includes a measurement event identifier; and the method further includes: receiving the quality information of the first cell reported by the terminal device.

In a possible design, the first information includes frequency information of the first SSB associated with the first cell and frequency information of the second SSB associated with the first cell.

According to a third aspect, an embodiment of this application provides a method for determining a frequency domain reference point. The method may be applied to a terminal device, or may be applied to a chip in a terminal device. An example in which the method is applied to a terminal device is used. In this method, the terminal device receives second information from a network device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located; the first SSB and the second SSB are associated with a same cell, and frequency information of the first SSB is different from frequency information of the second SSB; and after determining the first SSB as a serving SSB, the terminal device determines the frequency domain reference point based on the first offset; or after determining the second SSB as a serving SSB, the terminal device determines the frequency domain reference point based on the second offset.

In this manner, when one cell is associated with two SSBs, the network device may send, to the terminal device, a frequency domain offset corresponding to frequency information of each SSB, so that after determining the serving SSB, the terminal device can accurately determine the frequency domain reference point based on the frequency domain offset corresponding to the frequency information of the serving SSB. This prevents an error from occurring in subsequent resource allocation of the network device.

In a possible design, the method further includes: The terminal device receives third information from the network device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB. That the terminal device determines the frequency domain reference point based on the first offset may include: The terminal device determines the frequency domain reference point based on the first offset and the third offset. That the terminal device determines the frequency domain reference point based on the second offset may include: The terminal device determines the frequency domain reference point based on the second offset and the fourth offset.

It should be noted that the second information and the third information may be received by the terminal device from a same network device, or may be received from different network devices.

According to a fourth aspect, an embodiment of this application provides a method for determining a frequency domain reference point. The method may be applied to a network device, or may be applied to a chip in a network device. An example in which the method is applied to a network device is used. In this method, the network device determines second information, and sends the second information to a terminal device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located; and the first SSB and the second SSB are associated with a same cell, and frequency information of the first SSB is different from frequency information of the second SSB.

In a possible design, the method further includes: The network device sends third information to the terminal device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

It should be noted that the second information and the third information may be sent by a same network device to the terminal device, or may be sent by different network devices to the terminal device.

According to a fifth aspect, this application provides a communication apparatus. The communication apparatus may be a terminal device or a chip disposed in a terminal device. The communication apparatus has a function of implementing the first aspect or the third aspect. For example, the communication apparatus includes a corresponding module, unit, or means for performing steps in the first aspect or the third aspect. The function, unit or means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive configuration information from a network device. The processing unit may be configured to perform some internal operations of the communication apparatus.

Based on this design, in an embodiment, the communication unit is configured to receive first information from a first network device, where the first information indicates that a first cell is associated with a first SSB and a second SSB, and frequency information of the first SSB is different from frequency information of the second SSB; and the processing unit is configured to determine quality information of the first cell based on a measurement value of the first SSB and a measurement value of the second SSB.

In a possible implementation of this embodiment, the quality information of the first cell is determined based on the measurement value of the first SSB, the measurement value of the second SSB, and an auxiliary parameter, and the auxiliary parameter is obtained from the first network device; and the auxiliary parameter includes a preset threshold, a coefficient of the measurement value of the first SSB, and a coefficient of the measurement value of the second SSB.

In a possible implementation of this embodiment, that the quality information of the first cell is determined based on the measurement value of the first SSB, the measurement value of the second SSB, and an auxiliary parameter includes: If both the measurement value of the first SSB and the measurement value of the second SSB are greater than or equal to the preset threshold, the quality information of the first cell is determined based on the coefficient of the measurement value of the first SSB, the coefficient of the measurement value of the second SSB, the measurement value of the first SSB, and the measurement value of the second SSB; or if the measurement value of the first SSB or the measurement value of the second SSB is less than the preset threshold, the quality information of the first cell is determined based on a largest measurement value in the measurement value of the first SSB and the measurement value of the second SSB.

In a possible implementation of this embodiment, the communication unit is further configured to receive second information from a second network device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible implementation of this embodiment, the communication unit is further configured to receive third information from the second network device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible implementation of this embodiment, the processing unit is further configured to: after determining the first SSB as a serving SSB, determine the frequency domain reference point based on the first offset and the third offset; or after determining the second SSB as a serving SSB, determine the frequency domain reference point based on the second offset and the fourth offset.

In a possible implementation of this embodiment, the first cell is a cell on which the terminal device camps; or the first cell is a neighboring cell of a cell on which the terminal device camps.

In a possible implementation of this embodiment, the first information includes one or more association relationship identifiers and frequency information of an SSB corresponding to each association relationship identifier, where frequency information of the first SSB and frequency information of the second SSB correspond to a same association relationship identifier.

In a possible implementation of this embodiment, the first information is carried in a system message from the first network device.

In a possible implementation of this embodiment, the first cell is a cell accessed by the terminal device; or the first cell is a neighboring cell of a cell accessed by the terminal device.

In a possible implementation of this embodiment, the first information is carried in an RRC reconfiguration message or an RRC resume message from the first network device.

In a possible implementation of this embodiment, the RRC reconfiguration message or the RRC resume message further includes a measurement event identifier; and the processing unit is further configured to: if determining that the quality information of the first cell meets a reporting condition corresponding to the measurement event identifier, report the quality information of the first cell to the first network device by using the communication unit.

In a possible implementation of this embodiment, the first information includes frequency information of the first SSB associated with the first cell and frequency information of the second SSB associated with the first cell.

Based on this design, in another embodiment, the communication unit is configured to receive second information from a network device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located; the first SSB and the second SSB are associated with a same cell, and frequency information of the first SSB is different from frequency information of the second SSB; and the processing unit is configured to: after determining the first SSB as a serving SSB, determine the frequency domain reference point based on the first offset; or after determining the second SSB as a serving SSB, determine the frequency domain reference point based on the second offset.

In a possible implementation of this embodiment, the communication unit is configured to receive third information from the network device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB; and the processing unit is configured to: determine the frequency domain reference point based on the first offset and the third offset; or determine the frequency domain reference point based on the second offset and the fourth offset.

In another possible design, the communication apparatus includes a processor, and may further include a transceiver. The transceiver is configured to receive and send a signal, and the processor executes program instructions to complete the method in any possible design or implementation of the first aspect or the third aspect. The communication apparatus may further include one or more memories. The memory is configured to be coupled to the processor. The one or more memories may be integrated with the processor, or may be disposed independent of the processor. This is not limited in this application. The memory may store a computer program or instructions necessary for implementing the functions in the first aspect or the third aspect. The processor may execute the computer program or instructions stored in the memory. When the computer program is executed or the instructions are executed, the communication apparatus is enabled to implement the method in any possible design or implementation of the first aspect or the third aspect.

In another possible design, the communication apparatus includes a processor and a memory. The memory may store a computer program or instructions necessary for implementing the functions in the first aspect or the third aspect. The processor may execute the computer program or instructions stored in the memory. When the computer program is executed or the instructions are executed, the communication apparatus is enabled to implement the method in any possible design or implementation of the first aspect or the third aspect.

In another possible design, the communication apparatus includes at least one processor and an interface circuit. The at least one processor is configured to: communicate with another apparatus through the interface circuit, and perform the method in any possible design or implementation of the first aspect or the third aspect.

According to a sixth aspect, this application provides a communication apparatus. The communication apparatus may be a network device or a chip disposed in a network device. The communication apparatus has a function of implementing the second aspect or the fourth aspect. For example, the communication apparatus includes a corresponding module, unit, or means for performing steps in the second aspect or the fourth aspect. The function, unit or means may be implemented by software, may be implemented by hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to send system information to a terminal device. The processing unit may be configured to perform some internal operations of the communication apparatus.

Based on this design, in an embodiment, the processing unit is configured to determine first information, where the first information indicates that a first cell is associated with a first SSB and a second SSB, and frequency information of the first SSB is different from frequency information of the second SSB; and the communication unit is configured to send the first information to a terminal device, where the first information is used to determine quality information of the first cell.

In a possible implementation of this embodiment, the communication unit is further configured to send second information to the terminal device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible implementation of this embodiment, the communication unit is further configured to send third information to the terminal device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible implementation of this embodiment, the first cell is a cell on which the terminal device camps; or the first cell is a neighboring cell of a cell on which the terminal device camps.

In a possible implementation of this embodiment, the first information includes one or more association relationship identifiers and frequency information of an SSB corresponding to each association relationship identifier, where frequency information of the first SSB and frequency information of the second SSB correspond to a same association relationship identifier.

In a possible implementation of this embodiment, the first information is carried in a system message from the first network device.

In a possible implementation of this embodiment, the first cell is a cell accessed by the terminal device; or the first cell is a neighboring cell of a cell accessed by the terminal device.

In a possible implementation of this embodiment, the first information is carried in an RRC reconfiguration message or an RRC connection resume message from the first network device.

In a possible implementation of this embodiment, the RRC reconfiguration message or the RRC connection resume message further includes a measurement event identifier; and the communication unit is further configured to receive the quality information of the first cell reported by the terminal device.

In a possible implementation of this embodiment, the first information includes frequency information of the first SSB associated with the first cell and frequency information of the second SSB associated with the first cell.

Based on this design, in another embodiment, the processing unit is configured to determine second information; and the communication unit is configured to send the second information to a terminal device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located; and the first SSB and the second SSB are associated with a same cell, and frequency information of the first SSB is different from frequency information of the second SSB.

In a possible implementation of this embodiment, the communication unit is further configured to: send, by the network device, third information to the terminal device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In another possible design, the communication apparatus includes a processor, and may further include a transceiver. The transceiver is configured to receive and send a signal, and the processor executes program instructions to complete the method in any possible design or implementation of the second aspect or the fourth aspect. The communication apparatus may further include one or more memories. The memory is configured to be coupled to the processor. The one or more memories may be integrated with the processor, or may be disposed independent of the processor. This is not limited in this application. The memory may store a computer program or instructions necessary for implementing the functions in the second aspect or the fourth aspect. The processor may execute the computer program or instructions stored in the memory. When the computer program is executed or the instructions are executed, the communication apparatus is enabled to implement the method in any possible design or implementation of the second aspect or the fourth aspect.

In another possible design, the communication apparatus includes a processor and a memory. The memory may store a computer program or instructions necessary for implementing the functions in the second aspect or the fourth aspect. The processor may execute the computer program or instructions stored in the memory. When the computer program is executed or the instructions are executed, the communication apparatus is enabled to implement the method in any possible design or implementation of the second aspect or the fourth aspect.

In another possible design, the communication apparatus includes at least one processor and an interface circuit. The at least one processor is configured to: communicate with another apparatus through the interface circuit, and perform the method in any possible design or implementation of the second aspect or the fourth aspect.

According to a seventh aspect, this application provides a communication system. The communication system includes a terminal device, and the terminal device is configured to perform the method in any possible design of the first aspect or the third aspect. The communication system may further include a network device, and the network device is configured to perform the method in any possible design of the second aspect or the fourth aspect.

According to an eighth aspect, this application provides a computer-readable storage medium. The computer-readable storage medium stores computer-readable instructions. When a computer reads and executes the computer-readable instructions, the computer is enabled to perform the method in any possible design of the first aspect to the fourth aspect.

According to a ninth aspect, this application provides a computer program product. When a computer reads and executes the computer program product, the computer is enabled to perform the method in any possible design of the first aspect to the fourth aspect.

According to a tenth aspect, this application provides a chip. The chip includes a processor. The processor is coupled to a memory, and is configured to read and execute a software program stored in the memory, to perform the method in any possible design of the first aspect to the fourth aspect.

These aspects or other aspects in this application may be clearer and more intelligible in descriptions in the following embodiments.

DETAILED DESCRIPTION OF ILLUSTRATIVE EMBODIMENTS

Figure 1:
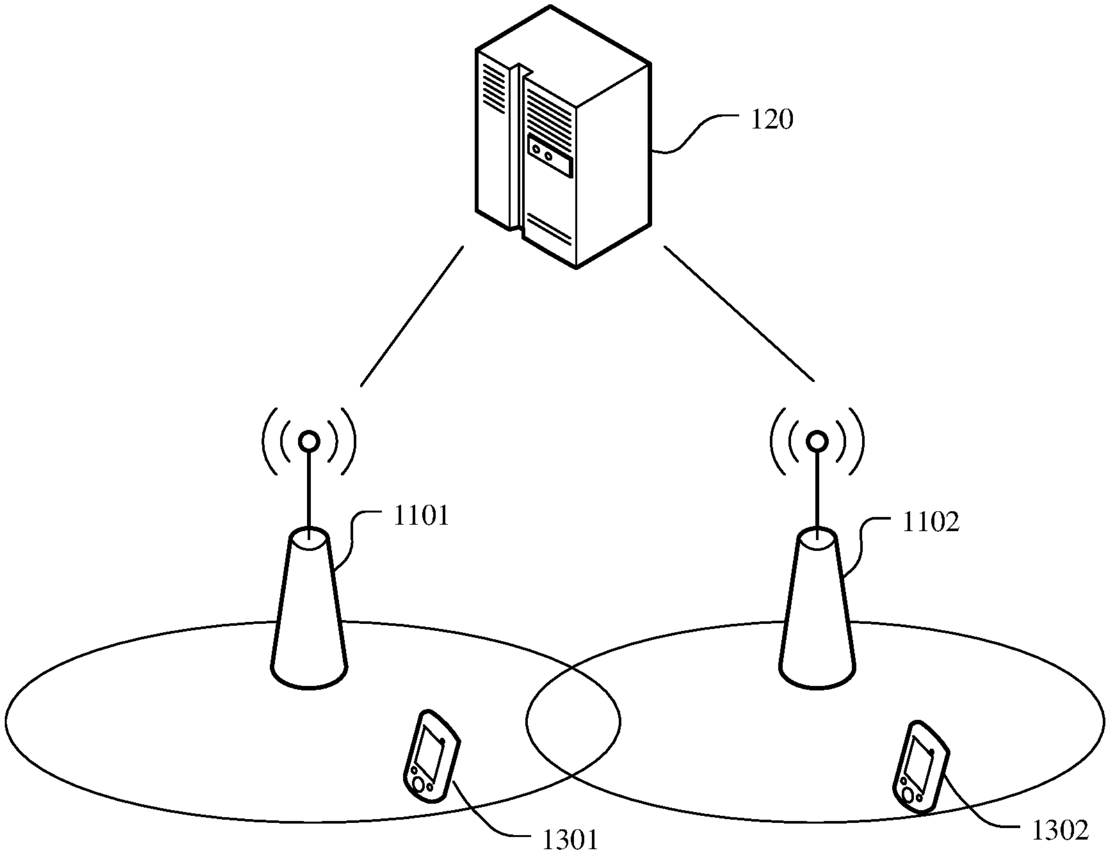
FIG. 1 is a schematic diagram of a network architecture to which an embodiment of this application is applicable.

The following describes technical solutions in embodiments of the present invention with reference to accompanying drawings in embodiments of the present invention. It is clear that the described embodiments are merely some rather than all of embodiments of the present invention.

First, some terms in embodiments of this application are described, to help a person skilled in the art have a better understanding.

(1) Terminal device: The terminal device may be a wireless terminal device that can receive scheduling and indication information from a network device. The wireless terminal device may be a device that provides a user with voice and/or data connectivity, a handheld device with a wireless connection function, or another processing device connected to a wireless modem. The terminal device may communicate with one or more core networks or the Internet by using a radio access network (RAN). The terminal device may be a mobile terminal device, for example, a mobile phone (or referred to as a cellular phone or a mobile phone), a computer, or a data card. For example, the terminal device may be a portable, pocket-sized, handheld, computer built-in, or in-vehicle mobile apparatus that exchange language and/or data with the radio access network. For example, the terminal device may be a device such as a personal communications service (PCS) phone, a cordless phone, a session initiation protocol (SIP) phone, a wireless local loop (WLL) station, a personal digital assistant (PDA), a tablet computer (Pad), or a computer with a wireless transceiver function. The wireless terminal device may also be referred to as a system, a subscriber unit, a subscriber station, a mobile station, a mobile station (MS), a remote station, an access point (AP), a remote terminal device (remote terminal), an access terminal device (access terminal), a user terminal device (user terminal), a user agent, a subscriber station (SS), a customer premises equipment (CPE), a terminal, a user equipment (UE), a mobile terminal (MT), or the like. The terminal device may also be a wearable device, a terminal device in a next-generation communication system such as a 5G communication system, a terminal device in a future evolved public land mobile network (PLMN), or the like.

(2) Network device: The network device may be a device in a wireless network. For example, the network device may be a radio access network (RAN) node (or device), or may be referred to as a base station, through which the terminal device accesses the wireless network. Currently, some examples of the RAN device are: a next-generation NodeB (gNodeB) in a 5G communication system, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), or the like. In addition, in a network structure, the network device may include a centralized unit (CU) node, a distributed unit (DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as a network device.

(3) Terms: The terms "system" and "network" may be used interchangeably in embodiments of this application. "At least one" means one or more, and "a plurality of" means two or more. "And/or" describes an association relationship between associated objects, and indicates that there may be three relationships. For example, A and/or B may indicate the following cases: Only A exists, both A and B exist, and only B exists, where A and B may be singular or plural. The character "/" usually indicates an "or" relationship between associated objects. "At least one item (piece) of the following" or a similar expression thereof refers to any combination of these items, including any combination of singular items (pieces) or plural items (pieces). For example, "at least one of A, B, and C" includes A, B, C, AB, AC, BC, or ABC. In addition, unless specifically specified, ordinal numbers such as "first" and "second"

in embodiments of this application are used to distinguish between a plurality of objects, but are not intended to limit an order, a time sequence, priorities, or importance of the plurality of objects.

FIG. 1 is a schematic diagram of a network architecture to which an embodiment of this application is applicable. As shown in FIG. 1, a terminal device 130 may access a wireless network, to access a service of an external network (for example, the Internet) by using a wireless network, or communicate with another device by using the wireless network, for example, may communicate with another terminal device. The wireless network includes a RAN and a core network (CN). The RAN is configured to connect a terminal device (for example, a terminal device 1301 or a terminal device 1302) to the wireless network, and the CN is configured to manage the terminal device and provide a gateway for communicating with an external network.

The RAN may include one or more RAN devices, for example, a RAN device 1101 and a RAN device 1102.

The CN may include one or more CN devices, for example, a CN device 120. When the network architecture shown in FIG. 1 is applicable to a 5G communication system, the CN device 120 may be an access and mobility management function (AMF) entity, a user plane management function (UPF) entity, or the like.

It should be understood that quantities of devices in the communication system shown in FIG. 1 are merely used as an example. This embodiment of this application is not limited thereto. In an actual application, the communication system may further include more terminal devices and more RAN devices, and may further include another device.

Figure 2:
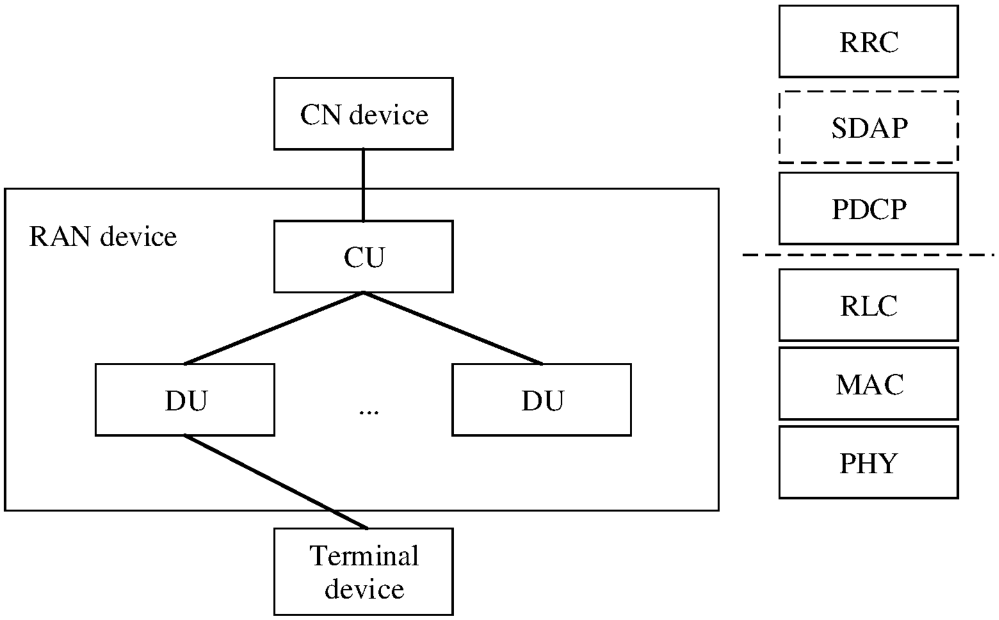
FIG. 2 is a schematic diagram of another network architecture to which an embodiment of this application is applicable.

FIG. 2 is a schematic diagram of another network architecture to which an embodiment of this application is applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some functions are independently implemented and some functions are integrated into the baseband apparatus. For example, in an LTE communication system, a RAN device includes a baseband apparatus and a radio frequency apparatus. The radio frequency apparatus may be remotely disposed relative to the baseband apparatus. For example, a remote radio unit (RRU) is a remote radio unit disposed relative to a BBU.

Communication between the RAN device and the terminal device complies with a specific protocol layer structure. For example, a control plane protocol layer structure may include functions of protocol layers such as an RRC layer, a packet data convergence protocol (PDCP) layer, a radio link control (RLC) layer, a media access control (MAC) layer, and a physical layer. A user plane protocol layer structure may include the functions of the protocol layers such as the PDCP layer, the RLC layer, the MAC layer, and the physical layer. In a possible implementation, a service data adaptation protocol (SDAP) layer may be further included above the PDCP layer.

The RAN device may implement functions of protocol layers such as RRC, PDCP, RLC, and MAC by using one node or a plurality of nodes. For example, in an evolved structure, the RAN device may include a CU and a DU, and a plurality of DUs may be all controlled by one CU. As shown in FIG. 2, the CU and the DU may be divided based on a protocol layer of a wireless network. For example, functions of the PDCP layer and a layer above the PDCP layer are set in the CU, and functions of protocol layers below the PDCP layer, such as the RLC layer and the MAC layer, are set in the DU.

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, division is performed based on a latency. A function whose processing time needs to meet a latency requirement is set on the DU, and a function whose processing time does not need to meet the latency requirement is set on the CU.

In addition, the radio frequency apparatus may be not placed in the DU but is integrated independently, or may be integrated into the DU, or a part is placed remotely from the DU and a remaining part is integrated into the DU. This is not limited herein.

Figure 3:
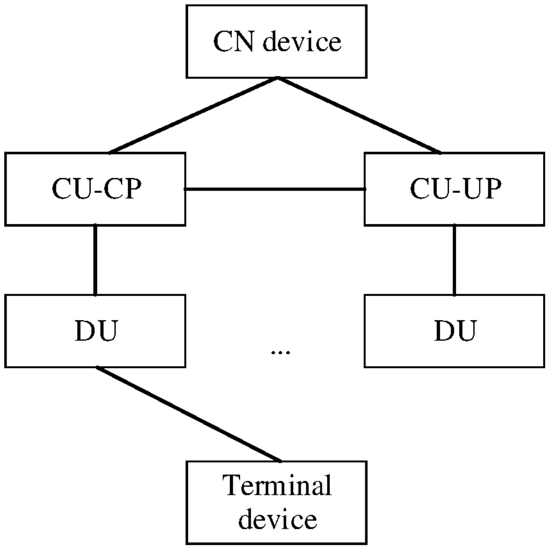
FIG. 3 is a schematic diagram of another network architecture to which an embodiment of this application is applicable.

FIG. 3 is a schematic diagram of another network architecture to which an embodiment of this application is applicable. Compared with the network architecture shown in FIG. 2, a control plane (CP) and a user plane (UP) of a CU may alternatively be separated into different entities for implementation in FIG. 3, and the different entities are a control plane (control panel, CP) CU entity (namely, a CU-CP entity) and a user plane (user panel, UP) CU entity (namely, a CU-UP entity).

In the foregoing network architecture, signaling generated by the CU may be sent to a terminal device by using DUs, or signaling generated by a terminal device may be sent to the CU by using the DUs. The DU may transparently transmit the signaling to the terminal device or the CU by directly encapsulating the signaling at a protocol layer without parsing the signaling. In the following embodiments, if transmission of the signaling between the DU and the terminal device is described, sending or receiving the signaling by the DU is applicable to the scenario. For example, signaling of an RRC layer or a PDCP layer is finally processed as signaling of a PHY layer and sent to the terminal device, or signaling of an RRC layer or a PDCP layer is converted from received signaling of a PHY layer. In this architecture, the signaling of the RRC or the PDCP layer may also be considered to be sent by the DU, or sent by the DU and a radio frequency apparatus.

The network architecture shown in FIG. 1, FIG. 2, or FIG. 3 is applicable to communication systems of various radio access technologies (RATs). For example, the communication system may be a 4G (or referred to as long term evolution (LTE)) communication system, may be a 5G (or referred to as new radio (NR)) communication system, or may be a transition system between the LTE communication system and the 5G communication system. The transition system may also be referred to as a 4.5G communication system. It is certain that the communication system may alternatively be a future communication system. A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of communication network architectures and emergence of new service scenarios, the technical solutions provided in embodiments of this application are also applicable to similar technical problems.

The apparatus in the following embodiments of this application may be located in a terminal device or a network device based on a function implemented by the apparatus. When the foregoing CU-DU structure is used, the network device may be a CU, a DU, or a RAN device including a CU and a DU.

In the network architecture shown in FIG. 1, FIG. 2, or FIG. 3, the terminal device may receive an SSB from the network device to synchronize with the network device, demodulate a system message, and the like. Herein, related technical features of the SSB are described with reference to FIG. 4*a* to FIG. 4*g*.

(1) Composition of the SSB

Figure 4A:
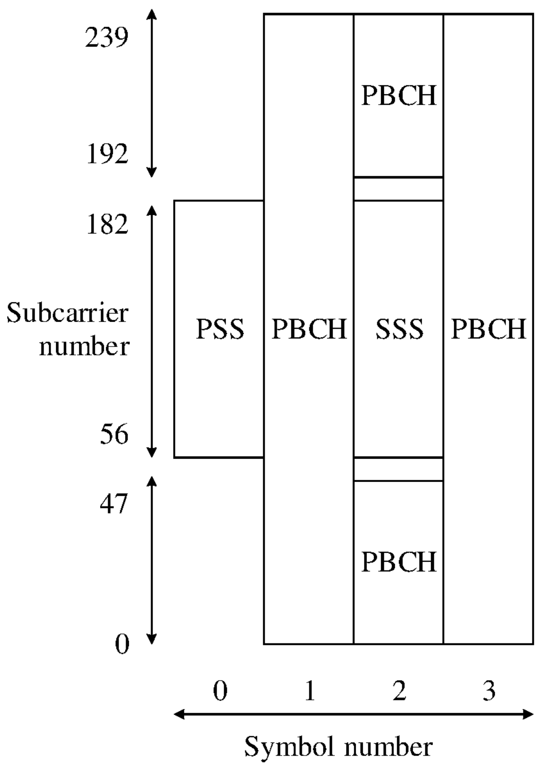
FIG. 4*a* is a schematic diagram of an SSB according to an embodiment of this application.

In embodiments of this application, a PSS, an SSS, and a PBCH jointly constitute an SSB. As shown in FIG. 4*a*, in time domain, one SSB occupies four orthogonal frequency division multiplexing (OFDM) symbols, which are a symbol 0 to a symbol 3. In frequency domain, one SSB occupies 20 resource blocks (RBs) (where one RB includes 12 subcarriers), that is, 240 subcarriers, and subcarrier numbers are 0 to 239. The PSS is located on 127 subcarriers in the middle of the symbol 0, and the SSS is located on 127 subcarriers in the middle of the symbol 2. To protect the PSS and the SSS, there are different guard subcarriers. The guard subcarriers do not carry signals, and subcarriers are separately reserved on two sides of the SSS as guard subcarriers. For example, blank areas on the two sides of the SSS in FIG. 4*a* are guard subcarriers. The PBCH occupies all subcarriers of the symbol 1 and the symbol 3, and occupies some subcarriers (that is, subcarriers other than guard subcarriers) in remaining subcarriers other than the subcarriers occupied by the SSS in all subcarriers of the symbol 2.

The PSS may be used to transmit a cell number, and the SSS may be used to transmit a cell group number. The cell number and the cell group number jointly determine a plurality of physical cell identifiers (PCIs) in a 5G communication system. Once the terminal device successfully finds the PSS and the SSS, the terminal device knows a physical cell identifier of the 5G carrier, and therefore has a capability of parsing a system message included in the SSB.

The system message in the SSB is carried on a PBCH channel. Because the information is information necessary for the terminal device to access a network, the information may be referred to as a main information block (MIB). The MIB may include a system frame number, a subcarrier spacing for initial access, and other information.

Because information included in the MIB is limited, the MIB does not support the terminal device in accessing a 5G cell. Therefore, the terminal device further needs to obtain a necessary system message, for example, a system information block (SIB) 1. SIB1 is transmitted on a physical downlink shared channel (PDSCH) in a periodicity of 160 milliseconds. Because the terminal device has obtained, from the MIB carried on the PBCH, a parameter used for transmitting SIB1 and a distribution status of control resources for scheduling SIB1, the terminal device can receive SIB1. In this way, the terminal device can obtain the system message necessary for accessing the 5G cell, and can subsequently access the 5G cell.

(2) Sending Mechanism of the SSB

Figure 4B:
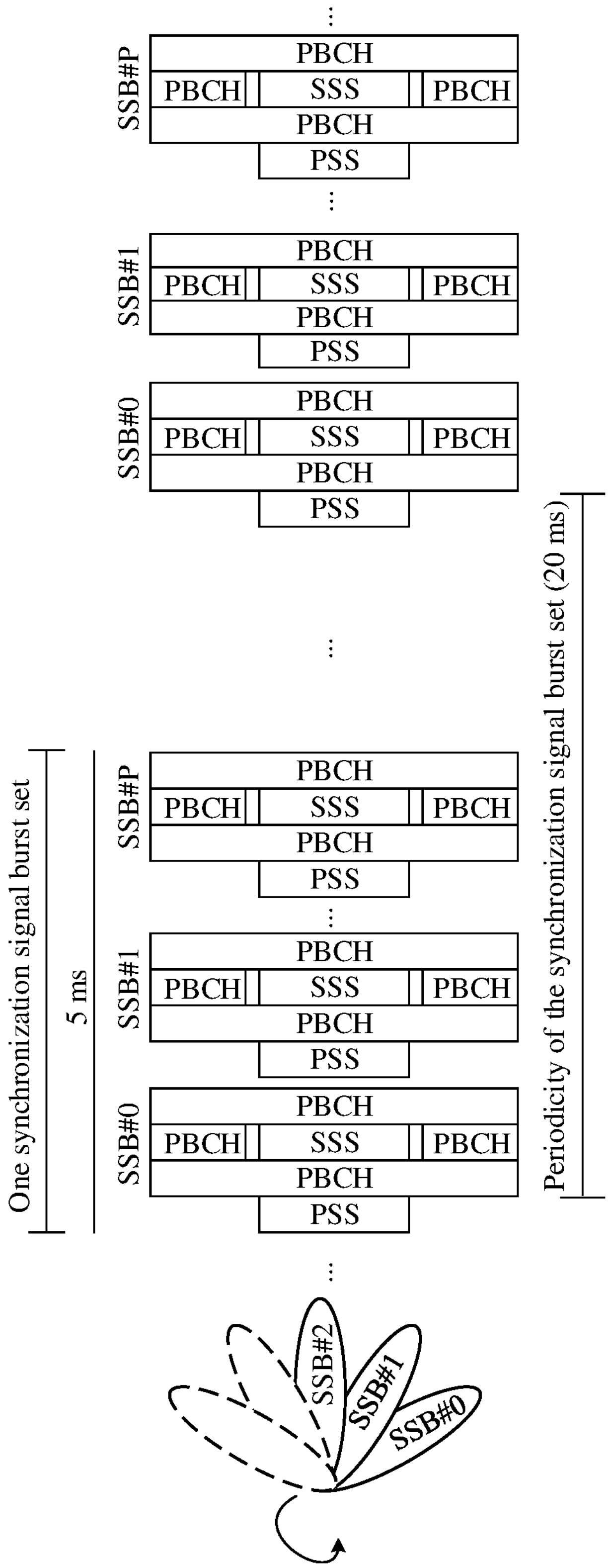
FIG. 4*b* is a schematic diagram of a synchronization burst set according to an embodiment of this application.

In a 5G communication system, for a cell (or a carrier), a network device may send SSBs by using different beams at different moments at one frequency, to implement broadcast beam coverage of the cell, as shown in FIG. 4*b*.

A set of SSBs sent by the network device in one beam scanning process may be referred to as a synchronization burst set (SS burst set). An SS burst set periodicity is equivalent to a periodicity of SSBs corresponding to a specific beam, and may be set to 5 ms (milliseconds), 10 ms, 20 ms, 40 ms, 80 ms, 160 ms, or the like. When the terminal device performs cell search, the terminal device cannot wait for an excessively long period of time at a frequency, and therefore performs cell search at a periodicity of 20 ms by default. If the terminal device waits for 20 ms at a frequency, but does not find an SSB, the terminal device considers that no 5G cell exists at the frequency, and may switch to a next frequency to try again.

Currently, there are a maximum of four, eight, or 64 SSBs in one SS burst set periodicity. When a carrier frequency band is less than or equal to 3 GHz, there are a maximum of four SSBs in one SS burst set periodicity. Each SS burst set is always located in a time interval of 5 ms. For an example of the SS burst set, refer to FIG. 4*b*. In FIG. 4*b*, an example in which the SS burst set periodicity is 20 ms and one SS burst set includes P SSBs is used.

(3) Time-Frequency Position of the SSB

A time domain position of the SSB may be specified in a protocol. The protocol specifies a relationship between different subcarrier spacings (SCSs) and a time domain pattern (pattern) of the SSB. Refer to FIG. 4*c*, FIG. 4*d*, FIG. 4*e*, FIG. 4*f*, and FIG. 4*g*. These figures represent time domain patterns of the SSB.

Figure 4C:
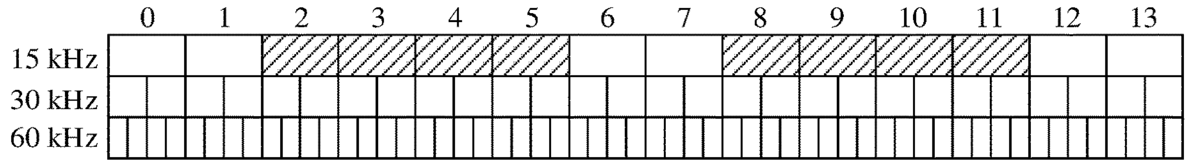
FIG. 4*c* to FIG. 4*g* are schematic diagrams of time domain patterns of SSBs according to embodiments of this application.

FIG. 4*c* represents a time domain pattern of SSBs included in one slot when the subcarrier spacing is 15 kHz. It can be learned that one slot includes two SSBs. Boxes with slashes in FIG. 4*c* represent OFDM symbols occupied by the SSBs.

Figure 4D:
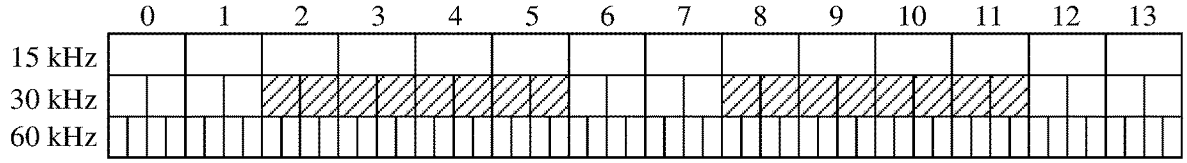

FIG. 4*d* represents a time domain pattern of SSBs included in one slot when the subcarrier spacing is 30 kHz. It can be learned that one slot includes two SSBs. Boxes with slashes in FIG. 4*d* represent OFDM symbols occupied by the SSBs.

Figure 4E:
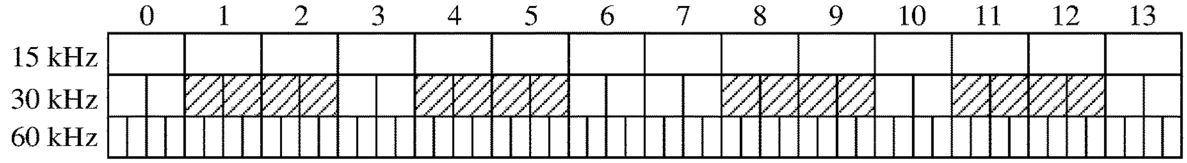

FIG. 4*e* represents another time domain pattern of SSBs included in one slot when the subcarrier spacing is 30 kHz. It can be learned that one slot includes two SSBs. Boxes with slashes in FIG. 4*e* represent OFDM symbols occupied by the SSBs.

Figure 4F:
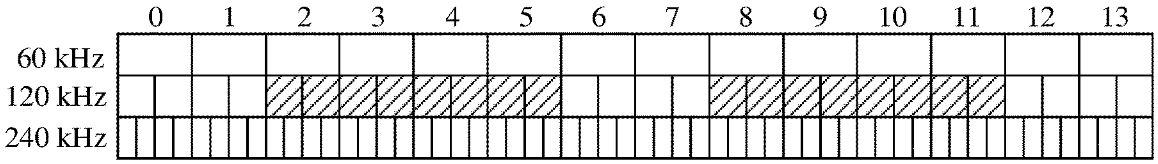

FIG. 4*f* represents a time domain pattern of SSBs included in one slot when the subcarrier spacing is 120 kHz. It can be learned that one slot includes four SSBs. Boxes with slashes in FIG. 4*f* represent OFDM symbols occupied by the SSBs.

Figure 4G:
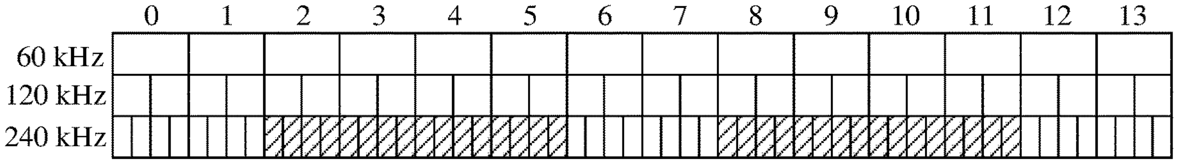

FIG. 4*g* represents a time domain pattern of SSBs included in one slot when the subcarrier spacing is 240 kHz. It can be learned that one slot includes eight SSBs. Boxes with slashes in FIG. 4*g* represent OFDM symbols occupied by the SSBs.

In a 4G communication system, SSBs may be located at the center of a carrier. Because a system bandwidth of the 5G communication system is large, where for example, a high frequency can reach 400 MHz, which is far greater than that of the 4G system bandwidth (with a maximum of 20 MHz), if SSBs are placed at the center of the carrier like the 4G communication system, the terminal device needs a long period of time and consumes very much power to search for SSBs at all frequencies in the system bandwidth. Therefore, in the 5G communication system, the SSBs are no longer placed at the center of the carrier, but are placed at some possible positions in each frequency band. Further, each frequency band may correspond to a plurality of pieces of frequency information (for example, an absolute radio frequency channel number (ARFCN)), and each piece of frequency information may correspond to a plurality of possible positions (where the network device sends an SSB at one of the possible positions). For a specific piece of frequency information, the terminal device may blindly detect a plurality of possible positions based on the synchronization raster, to obtain a frequency domain position of the SSB.

The 3rd Generation Partnership Project (3GPP) has discussed energy saving of network devices (namely, base stations). The energy saving of network devices is mainly to reduce energy consumption and save costs. A possible energy saving solution is that a network device superimposes and sends, in frequency domain (where for example, two frequencies are used in frequency domain, and sending time in time domain is halved), SSBs that are sent in one frequency periodicity, to reduce the sending time in time domain, and to save energy.

Figure 5A:
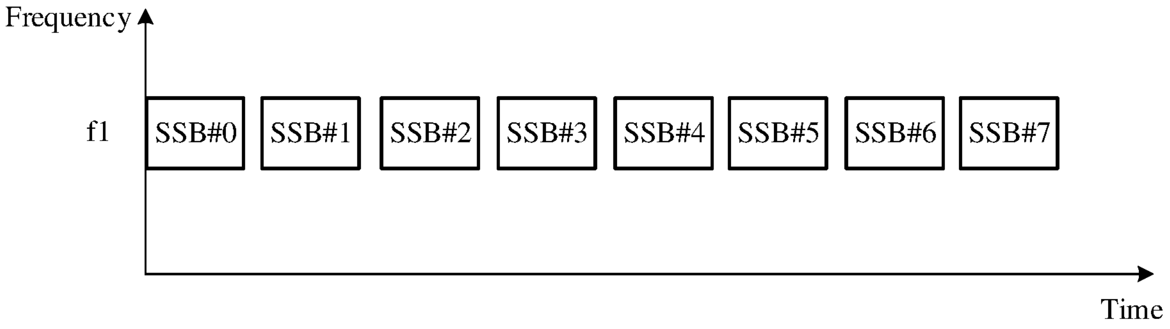
FIG. 5*a* is a schematic diagram of sending SSBs at one frequency according to an embodiment of this application.
Figure 5B:
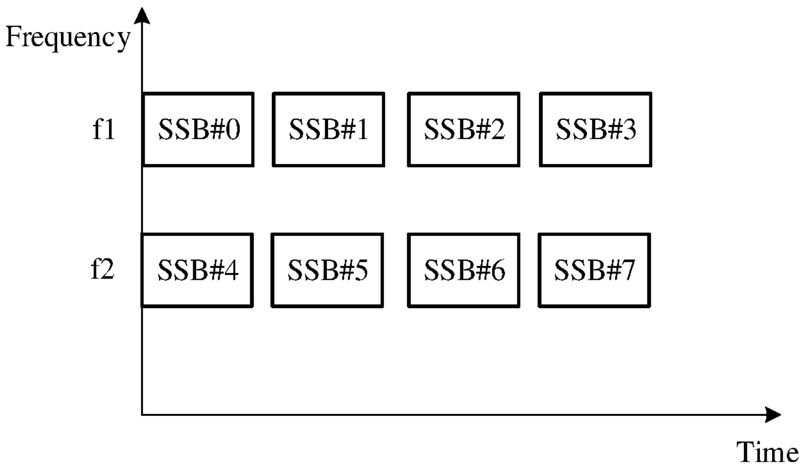
FIG. 5*b* is a schematic diagram of sending SSBs at two frequencies according to an embodiment of this application.

For example, refer to FIG. 5*a*. The network device sends SSBs (SSB #0 to SSB #7) by using one frequency at eight locations in time domain. For example, the network device sends SSB #0 to SSB #7 by using a frequency f1. In this manner, the network device needs to open a transmit channel at each time domain position. Consequently, time for which the transmit channel is open is long, and energy consumption is high. Refer to FIG. 5*b*. The network device sends SSBs (SSB #0 to SSB #7) by using two frequencies at four locations in time domain. For example, the network device sends SSB #0 to SSB #3 by using a frequency f1, and sends SSB #4 to SSB #7 by using a frequency f2. In this manner, the network device sends the SSBs at a plurality of frequencies in frequency domain, so that time for which the transmit channel is open in time domain can be effectively shortened, and energy consumption can be effectively reduced.

However, after the foregoing energy saving solution is introduced, some problems may occur. For example, quality information of a cell determined by the terminal device may be inaccurate (referred to as a problem 1). For another example, a frequency domain reference point determined by the terminal device may be inaccurate (referred to as a problem 2). Embodiments of this application study corresponding solutions to these problems.

1. For the Problem 1:

In this embodiment of this application, quality information of a cell reflects quality of the cell, and the quality of the cell may be quality of communication between a terminal device and a network device in the cell. For example, the quality information of the cell may be obtained by the terminal device by measuring a signal sent by the network device in the cell, and the quality information of the cell may include at least one of reference signal received power (RSRP), reference signal received quality (RSRQ), and a signal-to-noise ratio (SINR).

For example, a terminal device in an RRC idle (RRC_IDLE) mode or an RRC inactive (Inactive) mode may obtain the quality information of the cell by measuring an SSB sent by a network device in the cell. For a terminal device in an RRC connected (RRC_CONNECTED) mode, the quality information of the cell may be obtained by measuring an SSB or a channel state information-reference signal (channel state information-reference signal, CSI-RS) sent by a network device in the cell. In this embodiment of this application, an example in which the terminal device obtains the quality information of the cell by measuring the SSB is mainly used for description.

In a current solution (where for example, a network device sends the SSB in a manner shown in FIG. 5*a*), when determining quality information of a cell, a terminal device may measure an SSB at a frequency f1 associated with the cell, and further evaluate the quality information of the cell based on a measurement value of the SSB. When the energy saving solution is introduced (where for example, the network device sends an SSB in a manner shown in FIG. 5*b*), one cell may correspond to a plurality of frequencies (for example, two frequencies). If the terminal device still determines the quality information of the cell by using the foregoing solution, for example, determines the quality information of the cell based on a measurement value of an SSB at a frequency f1 or determines the quality information of the cell based on a measurement value of an SSB at a frequency f2, but does not comprehensively consider measurement values of SSBs at two frequencies, the determined quality information of the cell is inaccurate consequently.

Based on this, an embodiment of this application provides a method for determining cell quality information to improve accuracy of determining cell quality information.

For example, the method provided in this embodiment of this application may include: A terminal device receives first information from a first network device, where the first information indicates that a first cell is associated with a first SSB and a second SSB, and frequency information of the first SSB is different from frequency information of the second SSB; and the terminal device may determine quality information of the first cell based on a measurement value of the first SSB and a measurement value of the second SSB. That the frequency information of the first SSB is different from the frequency information of the second SSB may mean that a frequency used to send the first SSB is different from a frequency used to send the second SSB. For example, the first SSB is sent at a first frequency, and the second SSB is sent at a second frequency.

In this manner, after learning, based on the first information sent by the first network device, that the first cell is associated with the two SSBs, the terminal device may determine the quality information of the first cell by comprehensively considering the measurement values of the two SSBs, so that accuracy of determining the cell quality information can be effectively improved.

It should be noted that: (1) The first network device may send the first information in a plurality of manners. In a possible manner, the first network device may send the first information in a broadcast manner. For example, the first network device sends the first information by using a system message (refer to Embodiment 1 below). In another possible manner, the first network device may send the first information to the terminal device by using dedicated signaling, for example, send the first information to the terminal device by using an RRC message (refer to Embodiment 2 below).

(2) After learning, based on the first information, that the first cell is associated with the first SSB and the second SSB, the terminal device may separately search for the SSB at the first frequency and the second frequency, and further determine the quality information of the first cell based on measurement values of one or more SSBs found at the first frequency and measurement values of one or more SSBs found at the second frequency. In this embodiment of this application, an example in which the terminal device determines the quality information of the first cell based on a measurement value of an SSB (namely, the first SSB) found at the first frequency and a measurement value of an SSB (namely, the second SSB) found at the second frequency is used for description.

For example, a case shown in FIG. 5*b* is used as an example. The terminal device may search for SSB #0 to SSB #3 at the frequency f1, search for SSB #4 to SSB #7 at the frequency f2, and further determine the quality information of the cell based on the measurement values of SSB #0 to SSB #7. Considering that information carried in SSB #0 to SSB #3 corresponding to the frequency f1 is the same, and information carried in SSB #4 to SSB #7 corresponding to the frequency f2 is the same, to reduce power consumption of the terminal device to search for the SSBs, the terminal device may search for one SSB at one frequency. To be specific, the terminal device may search for one SSB (for example, SSB #0) at the frequency f1, search for one SSB (for example, SSB #5) at the frequency f2, and further determine the quality information of the cell based on a measurement value of SSB #0 and a measurement value of SSB #5.

(3) In this embodiment of this application, an example in which the first network device sends the SSBs at two frequencies for one cell is used for description. To further save energy, the first network device may alternatively send the SSBs at more frequencies. When the first network device sends the SSBs at more frequencies, the solution in this embodiment of this application may also be adaptively adjusted. For example, when the first network device sends the SSBs at four frequencies for the first cell, the first information may also indicate that the first cell is associated with four SSBs, and then the terminal device may determine the quality information of the first cell based on measurement values of the SSBs received at the four frequencies.

(4) That the first cell is associated with the first SSB and the second SSB may be understood as that both the first SSB and the second SSB are SSBs sent by the network device in the first cell. That the first cell is associated with the first SSB and the second SSB may also be described as that the first cell is associated with first frequency information and second frequency information. The first frequency information is used as an example. The first frequency information may be information that identifies the first frequency, for example, an ARFCN. After determining that the first cell is associated with the first frequency information and the second frequency information, the terminal device may search for the first SSB at a frequency domain position corresponding to the first frequency information, and search for the second SSB at a frequency domain position corresponding to the second frequency information.

(5) The SSB in this embodiment of this application may be a cell-defining SSB (cell-defining SSB, CD-SSB). For example, the network device may send a plurality of SSBs in a frequency range of one carrier. PCIs of SSBs sent at different frequency domain positions do not need to be unique, in other words, SSBs sent at different frequency domain positions may have different PCIs. When an SSB is associated with remaining minimum system information (remaining minimum system information, RMSI) (such as SIB1), the SSB corresponds to a single cell with a unique NR cell global identifier (NR cell global identifier, NCGI), and the SSB is referred to as a CD-SSB.

In this embodiment of this application, the terminal device may determine the quality information of the cell in a plurality of scenarios. For example, in a cell reselection scenario (where the terminal device is in an idle mode or an inactive mode), the terminal device may determine quality information of a cell on which the terminal device is currently camped and quality information of a neighboring cell of the cell on which the terminal device is currently camped, to perform reselection. For another example, in a cell handover scenario (where the terminal device is in a connected mode), the terminal device may determine quality information of a cell currently accessed by the terminal device and quality information of a neighboring cell of the cell currently accessed by the terminal device, to perform handover.

The following describes in detail the solution provided in embodiments of this application by using a cell reselection scenario and a cell handover scenario as examples.

Embodiment 1

In Embodiment 1, a possible implementation of the solution provided in embodiments of this application is described based on the cell reselection scenario.

First, related technical features of cell reselection are described.

After camping on a suitable cell and staying for proper time (for example, is), a terminal device may perform cell reselection. Specifically, the terminal device may sort, according to a criterion R, cells that meet a criterion S in a candidate list for cell reselection. The cells that meet the criterion S may be simply understood as cells whose quality meets a specific requirement, and are sorted according to the criterion R, for example, the cells are sorted in descending order of quality. For a cell whose rank is the highest, that is, a highest-ranked cell, when duration in which the terminal device camps on a current serving cell is greater than is, and duration in which the highest-ranked cell is not a serving cell of the terminal device is greater than a preset threshold, the terminal device reads system information of the highest-ranked cell, and determines whether access to the highest-ranked cell is allowed. If yes, the terminal device reselects to the highest-ranked cell, and continues to perform the foregoing cell reselection process in the highest-ranked cell.

Cell reselection can be classified into intra-frequency cell reselection and inter-frequency cell reselection (namely, cell reselection between different RATs). Parameters related to cell reselection are from system messages, such as SIB3, SIB4, and SIB5, of the serving cell. SIB3 includes intra-frequency and inter-frequency cell reselection parameter information, for example, includes parameter information for calculation in a formula of criterion R for ranking in cell reselection. SIB4 includes reselection configuration information of one or more cells used for intra-frequency reselection. SIB5 includes reselection configuration information of one or more cells used for inter-frequency reselection. Reselection configuration information of each cell may include an identifier of the cell and frequency information associated with the cell.

The reselection configuration information of one or more cells included in SIB4 is used as an example. In an existing solution (for example, the solution shown in FIG. 5*a*), each cell is associated with one piece of frequency information. Refer to Table 1. The one or more cells include a cell 1, a cell 2, and a cell 3, where frequency information associated with the cell 1 is ARFCN-1, frequency information associated with the cell 2 is ARFCN-2, and frequency information associated with the cell 3 is ARFCN-3.

TABLE 1

| Example of reseleсtion configuration information of one or more cells | |
|---|---|
| Cell identifier | Frequency information |
| Cell 1 | ARFCN-1 |
| Cell 2 | ARFCN-2 |
| Cell 3 | ARFCN-3 |

Figure 6:
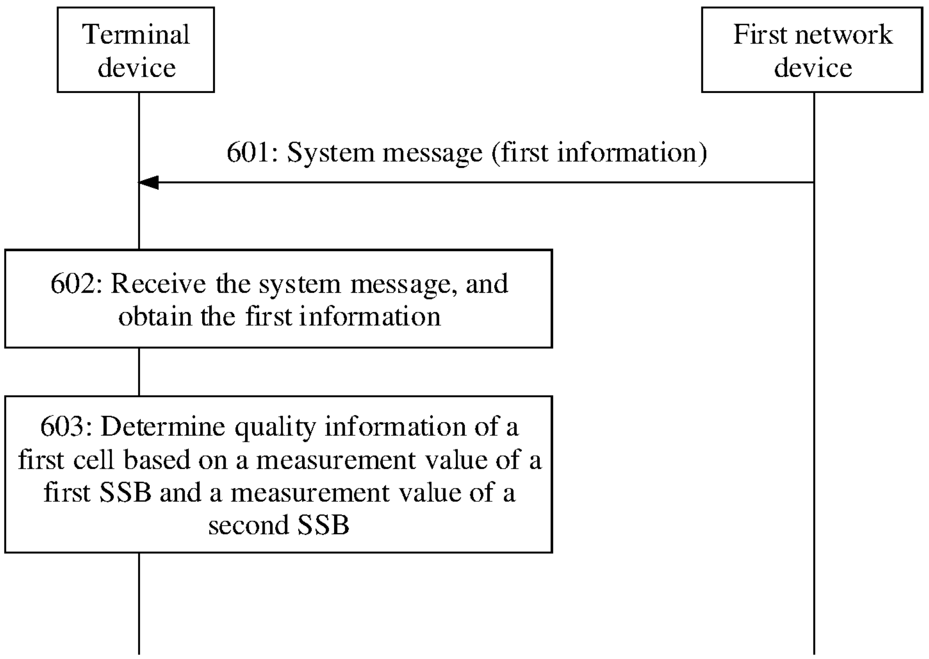
FIG. 6 is a schematic flowchart corresponding to a method for determining cell quality information according to Embodiment 1 of this application.

Based on the foregoing descriptions of cell reselection, the following describes, with reference to FIG. 6, a method for determining cell quality information provided in an embodiment of this application after the energy saving solution (for example, the solution shown in FIG. 5*b*) is introduced.

FIG. 6 is a schematic flowchart corresponding to a method for determining cell quality information according to Embodiment 1 of this application. As shown in FIG. 6, the method includes the following steps.

Step 601: A first network device sends a system message, where the system message includes first information.

The first information indicates that a first cell is associated with a first SSB and a second SSB, the first SSB is sent at a first frequency, and the second SSB is sent at a second frequency.

Correspondingly, in step 602, a terminal device may receive the system message from the first network device, and obtain the first information.

The following describes in detail two possible implementations of the first information with reference to Implementation 1 and Implementation 2.

Implementation 1: The first information may include reselection configuration information of one or more cells, and the one or more cells include the first cell. Reselection configuration information of the first cell includes an identifier of the first cell and first frequency information and second frequency information that are associated with the first cell.

For example, the one or more cells include a cell 1, a cell 2, and a cell 3. First frequency information associated with the cell 1 is ARFCN-1, and second frequency information associated with the cell 1 is ARFCN-4. First frequency information associated with the cell 2 is ARFCN-2, and second frequency information associated with the cell 2 is ARFCN-5. First frequency information associated with the cell 3 is ARFCN-3, and second frequency information associated with the cell 3 is ARFCN-6. Refer to Table 2. Table 2 is an example of content included in the first information.

TABLE 2

| Example of content included in the first information | | |
|---|---|---|
| Cell identifier | First frequency information | Second frequency information |
| Cell 1 | ARFCN-1 | ARFCN-4 |
| Cell 2 | ARFCN-2 | ARFCN-5 |
| Cell 3 | ARFCN-3 | ARFCN-6 |

In this manner, when the first cell is associated with two pieces of frequency information, the two pieces of frequency information may be configured in the reselection configuration information of the first cell (that is, the reselection configuration information of the cell in the existing solution is added and modified), so that after receiving the reselection configuration information of the first cell, the terminal device can learn of the two pieces of frequency information associated with the first cell.

It should be noted that, in Implementation 1, the cell 1, the cell 2, and the cell 3 may be cells used for intra-frequency reselection. In this case, the system message that carries the first information may be SIB4. In another possible embodiment, the cell 1, the cell 2, and the cell 3 may alternatively be cells used for inter-frequency reselection. In this case, the system message that carries the first information may be SIB5.

Implementation 2: The first information may include one or more association relationship identifiers and frequency information of two SSBs corresponding to each association relationship identifier. The frequency information of the two SSBs corresponding to each association relationship identifier may also be described as two pieces of frequency information corresponding to each association relationship identifier, for example, frequency information 1 and frequency information 2. Further, the two pieces of frequency information associated with the first cell correspond to a same association relationship identifier. In this embodiment of this application, the association relationship identifier associates frequency information of the two SSBs. The association relationship identifier may be information such as an association relationship number. Any information that can be used to associate the frequency information of the two SSBs may be understood as the association relationship identifier.

For example, one or more association relationship identifiers include an association relationship 1, an association relationship 2, and an association relationship 3. Two pieces of frequency information corresponding to the association relationship 1 include ARFCN-1 and ARFCN-4, two pieces of frequency information corresponding to the association relationship 2 include ARFCN-2 and ARFCN-5, and two pieces of frequency information corresponding to the association relationship 3 include ARFCN-3 and ARFCN-6. Refer to Table 3. Table 3 is an example of content included in the first information.

TABLE 3

| Example of content included in the first information | | |
|---|---|---|
| Association relationship identifier | Frequency information 1 | Frequency information 2 |
| Association relationship 1 | ARFCN-1 | ARFCN-4 |
| Association relationship 2 | ARFCN-2 | ARFCN-5 |
| Association relationship 3 | ARFCN-3 | ARFCN-6 |

In this manner, when the first cell is associated with the two pieces of frequency information, the first network device may further send the first information to the terminal device on a basis of sending the reselection configuration information of the first cell (that is, the reselection configuration information of the cell in the existing solution does not need to be added or modified). Correspondingly, after receiving the reselection configuration information of the first cell and the first information, the terminal device can learn of the two pieces of frequency information associated with the first cell. For example, the first cell is the cell 1 described above. The terminal device learns, based on the reselection configuration information of the cell 1 (refer to Table 1), that the cell 1 is associated with ARFCN-1, and learns, based on the first information (refer to Table 3), that ARFCN-1 and ARFCN-4 correspond to a same association relationship identifier. Further, the terminal device may determine that the cell 1 is associated with two pieces of frequency information (which are respectively ARFCN-1 and ARFCN-4).

It should be noted that, in Implementation 2, the first information may be carried in a system message (for example, SIB4 or SIB5). For example, a new field may be added to the system message to carry the first information. In another possible embodiment, the first information may alternatively be carried in another possible message. This is not specifically limited. Alternatively, the first information may be predefined in a protocol. In this case, the terminal device may no longer need to obtain the first information from the first network device. In this embodiment of this application, an example in which the first information is carried in the system message is used for description.

In this embodiment of this application, the first cell may be a cell on which the terminal device currently camps. In this case, the first cell is a cell within coverage of the first network device. Alternatively, the first cell may be a neighboring cell of a cell (for example, a second cell) on which the terminal device camps. In this case, the first cell may be a cell within coverage of the first network device, or may be a cell within coverage of another network device. In other words, the terminal device may determine the quality information of the cell by applying the measurement method provided in this embodiment of this application to the plurality of cells, to perform cell reselection more accurately, and improve communication quality.

Step 603: The terminal device determines the quality information of the first cell based on a measurement value of the first SSB and a measurement value of the second SSB.

The terminal device may determine the quality information of the first cell based on the measurement value of the first SSB and the measurement value of the second SSB in a plurality of manners.

In a possible implementation, the first network device may send auxiliary parameter information to the terminal device, where the auxiliary parameter information includes a preset threshold, a coefficient of the measurement value of the first SSB, and a coefficient of the measurement value of the second SSB. The preset threshold is used to determine whether combination calculation can be performed on the measurement value of the first SSB and the measurement value of the second SSB. The coefficient of the measurement value of the first SSB may be understood as a corresponding weight when the measurement value of the first SSB participates in combination calculation, or a contribution rate of the measurement value of the first SSB to the quality information of the first cell when the measurement value of the first SSB participates in combination calculation. For a meaning of the coefficient of the measurement value of the second SSB, refer to that of the coefficient of the measurement value of the first SSB. Details are not described again. Correspondingly, the terminal device receives the auxiliary parameter, and determines the quality information of the first cell based on the measurement value of the first SSB, the measurement value of the second SSB, and the auxiliary parameter.

For example, if both the measurement value of the first SSB and the measurement value of the second SSB are greater than or equal to the preset threshold, combination calculation is performed on the measurement value of the first SSB and the measurement value of the second SSB based on the coefficient of the measurement value of the first SSB and the coefficient of the measurement value of the second SSB, to determine the quality information of the first cell. For example, the measurement value of the first SSB is X, the measurement value of the second SSB is Y, and both X and Y exceed the preset threshold (M). The coefficient of the measurement value of the first SSB is a, and the coefficient of the measurement value of the second SSB is b. The terminal device may determine that the quality information of the first cell is a function about X, Y, a, and b, that is, $f(X,Y,a,b)$, for example, $f(X,Y,a,b)=a*X+b*Y$. In this manner, by setting and applying the preset threshold, it can be effectively ensured that a measurement value of an SSB participating in combination calculation is appropriate. Further, it is considered that different SSBs have different frequency domain positions, and contribution rates to the quality information of the cell are also different. For example, if a center frequency domain position of the SSB is close to a center frequency domain position of the cell, a contribution rate to the quality information of the cell is large; or if a center frequency domain location of the SSB is far away from a center frequency domain location of the cell, a contribution rate to the quality information of the cell is small. Further, during combination calculation, a coefficient of a measurement value of each SSB is set and applied, so that the determined quality information of the cell is more accurate.

For another example, if the measurement value of the first SSB is greater than or equal to the preset threshold, and the measurement value of the second SSB is less than the preset threshold, the terminal device may determine the quality information of the first cell based on the measurement value of the first SSB. By setting and applying the preset threshold, the terminal device can remove an improper SSB measurement value, to improve accuracy of determining the quality information of the cell.

For another example, if the measurement value of the first SSB is less than the preset threshold, and the measurement value of the second SSB is greater than or equal to the preset threshold, the terminal device may determine the quality information of the first cell based on the measurement value of the second SSB. By setting and applying the preset threshold, the terminal device can remove an improper SSB measurement value, to improve accuracy of determining the quality information of the cell.

For another example, if both the measurement value of the first SSB and the measurement value of the second SSB are less than the preset threshold, the terminal device may determine the quality information of the second cell based on a largest measurement value in the measurement value of the first SSB and the measurement value of the second SSB.

For example, the auxiliary parameter information may be sent by the first network device to the terminal device by using a system message. The auxiliary parameter information and the first information may be carried in a same system message, or may be carried in different system messages. This is not specifically limited.

It should be noted that in Embodiment 1, the first cell is used as an example for description. In specific implementation, when each of a plurality of cells is associated with two pieces of frequency information, the terminal device may determine quality information of the plurality of cells in the foregoing manner, and further perform a cell reselection operation based on the determined quality information of the plurality of cells. According to the solution in this embodiment of this application, accuracy of the quality information of the cell can be effectively improved, to provide a more accurate basis for the terminal device to perform cell reselection.

Embodiment 2

In Embodiment 2, a possible implementation of the solution provided in embodiments of this application is described based on the cell handover scenario.

First, related technical features of cell handover are described.

When a terminal device in a connected mode moves from one cell to another cell, to keep communication uninterrupted, cell handover needs to be performed. Specifically, a first network device may send measurement control information to a terminal device. After receiving the measurement control information, the terminal device may measure a serving cell and/or a neighboring cell. If S measurement (S-Measure) is configured in the measurement control message, whether neighboring cell measurement (which may include intra-frequency measurement and inter-frequency measurement) needs to be performed needs to be determined based on an S measurement configuration. When a measurement reporting condition is met, the terminal device may report a measurement result to the first network device.

For example, the measurement control information may include a measurement object, a reporting configuration, a measurement identifier, and the like. (1) The measurement object may be frequency information, and the terminal device may receive an SSB based on the frequency information and perform measurement.

(2) The reporting configuration includes three types of measurement reporting and related configurations. The three types of measurement reporting are as follows: Type 1: A measurement event triggers reporting once, where the measurement event may include A1 to A5, B1, and B2, and a quantity of reporting times is one. Type 2: Periodic reporting. Type 3: A measurement event triggers periodic reporting, where triggering events include A1 to A5, B1, and B2, and a quantity of reporting times is a plurality. A1 to A5 are used for intra-RAT measurement. A1: Quality of a serving cell is higher than a specific threshold. A2: Quality of a serving cell is lower than a specific threshold. A3: Quality of a neighboring cell is higher than that of a serving cell by a specific value. A4: Quality of a neighboring cell is higher than a specific threshold. A5: Quality of a serving cell is lower than a specific threshold, and quality of a neighboring cell is higher than a specific threshold. B1 and B2 are used for inter-RAT measurement. B1: Quality of a neighboring cell is higher than a specific threshold. B2: Quality of a serving cell is lower than a specific threshold, and quality of a neighboring cell is higher than a specific threshold.

When the type of measurement reporting is type 1 or type 3, the reporting configuration may include a measurement event identifier.

Figure 7:
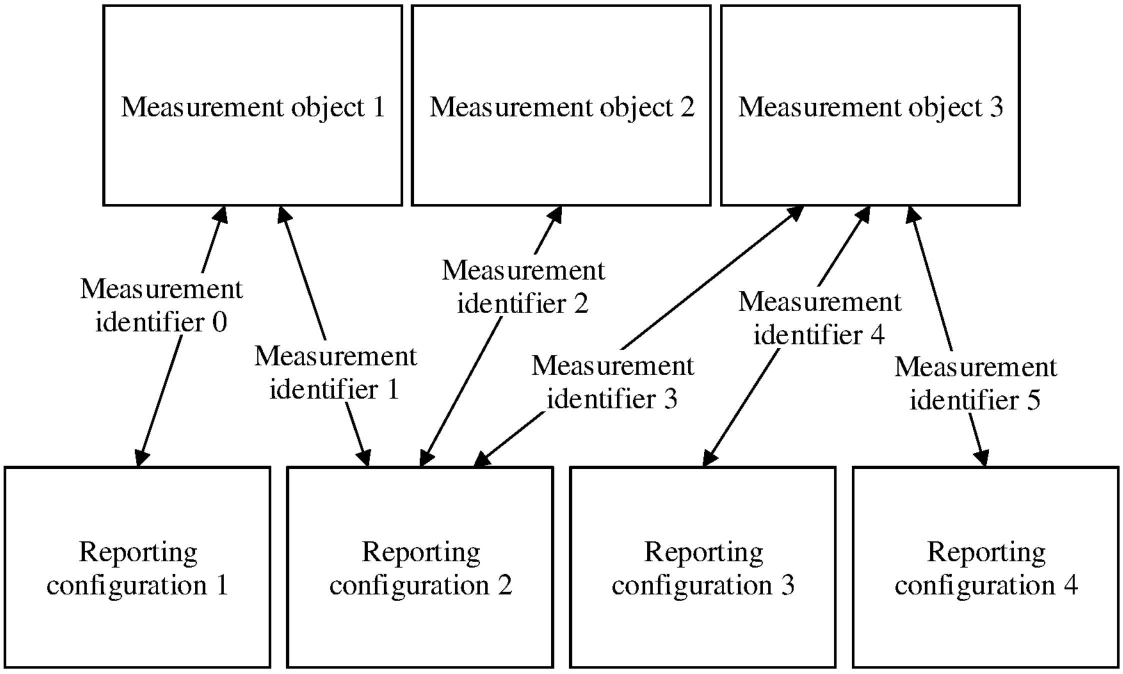
FIG. 7 is an example of a measurement identifier according to an embodiment of this application.

(3) The measurement identifier associates one reporting configuration with one measurement object, that is, one measurement identifier identifies one measurement object and one reporting configuration. As shown in FIG. 7, one measurement object may be associated with different reporting configurations, and one reporting configuration may also be associated with different measurement objects.

Figure 8:
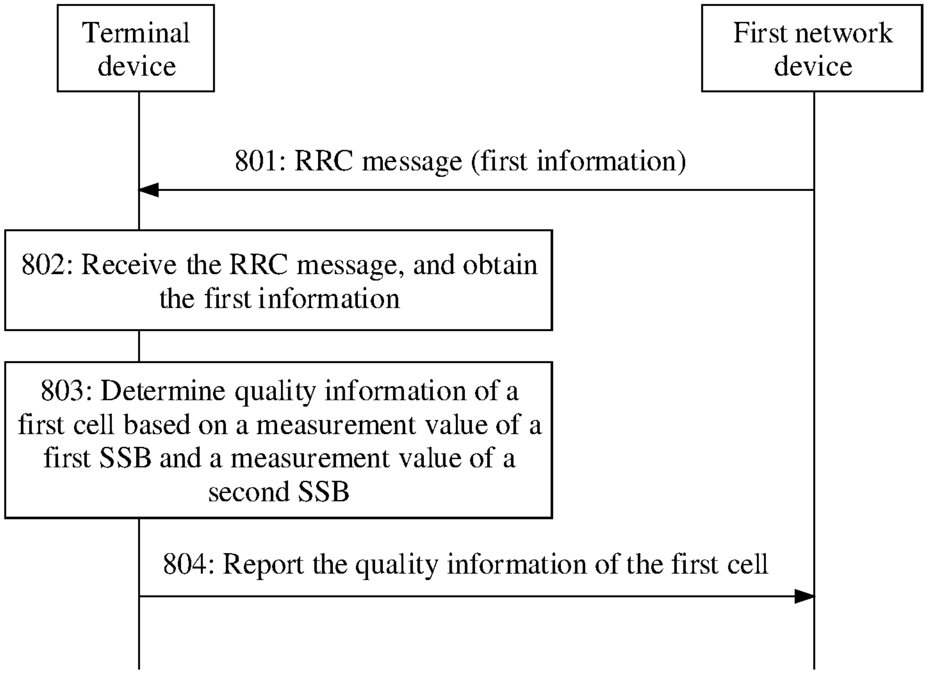
FIG. 8 is a schematic flowchart corresponding to a method for determining cell quality information according to Embodiment 2 of this application.

Based on the foregoing descriptions, the following describes, with reference to FIG. 8, a method for determining cell quality information provided in an embodiment of this application after the energy saving solution (for example, the solution shown in FIG. 5*b*) is introduced.

FIG. 8 is a schematic flowchart corresponding to a method for determining cell quality information according to Embodiment 2 of this application. As shown in FIG. 8, the method includes the following steps.

Step 801: A first network device sends an RRC message, where the RRC message includes first information.

The first information indicates that a first cell is associated with a first SSB and a second SSB, the first SSB is sent at a first frequency, and the second SSB is sent at a second frequency.

Correspondingly, in step 802, a terminal device may receive the RRC message from the first network device, and obtain the first information.

For example, the RRC message may be an RRC connection reconfiguration message or an RRC reconfiguration message, or may be an RRC connection resume message, an RRC resume message, or an RRC release message. This is not specifically limited.

The first information may include measurement object configuration information of one or more cells, where the one or more cells include a first cell, and the measurement object configuration information of the first cell includes a first measurement object and a second measurement object of the first cell. The first measurement object may be first frequency information associated with the first cell, and the second measurement object may be second frequency information associated with the first cell. Further, after receiving the first information, the terminal device can learn that the first cell is associated with the two pieces of frequency information.

In this embodiment of this application, the first cell may be a cell (namely, a serving cell) currently accessed by the terminal device. In this case, the first cell is a cell within coverage of the first network device. Alternatively, the first cell may be a neighboring cell of a cell (for example, a second cell) accessed by the terminal device. In this case, the first cell may be a cell within coverage of the first network device, or may be a cell within coverage of another network device (for example, a second network device).

For example, the first cell is the serving cell, and a measurement object (measObjectId) corresponding to the serving cell may be indicated by a servingCellMO field in a configuration information element ServingCellConfig of the serving cell. In the current solution, only one servingCellMO field is configured in the configuration information element of the serving cell. Therefore, after the energy saving solution is introduced (that is, the serving cell is associated with two pieces of frequency information), another servingCellMO field may be added to the configuration information element of the serving cell, that is, two servingCellMO fields are configured.

Step 803: The terminal device determines the quality information of the first cell based on a measurement value of the first SSB and a measurement value of the second SSB.

The terminal device may determine the quality information of the first cell based on the measurement value of the first SSB and the measurement value of the second SSB in a plurality of manners. In a possible implementation, the first network device may send auxiliary parameter information to the terminal device, where the auxiliary parameter information includes a preset threshold, a coefficient of the measurement value of the first SSB, and a coefficient of the measurement value of the second SSB. Then the terminal device receives the auxiliary parameter information, and determines the quality information of the first cell based on the measurement value of the first SSB, the measurement value of the second SSB, and the auxiliary parameter. For specific implementation, refer to the descriptions in Embodiment 1.

Step 804: If determining that the quality information of the first cell meets a reporting condition corresponding to the measurement event identifier, the terminal device reports the quality information of the first cell to the first network device.

For example, the RRC message may further include the measurement event identifier. For example, the measurement event identifier may be an identifier of a measurement event A1, the first cell is the serving cell, and that the terminal device determines that the quality information of the first cell meets the reporting condition corresponding to the measurement event identifier may be that after determining the quality information of the serving cell, the terminal device determines that the quality of the serving cell is higher than a specified threshold.

It should be noted that the foregoing is described by using an example in which the terminal device determines the quality information of the first cell based on the measurement value of the first SSB and the measurement value of the second SSB and reports the quality information of the first cell to the first network device. In another possible embodiment, the terminal device may separately report the measurement value of the first SSB and the measurement value of the second SSB to the first network device, or report a largest measurement value in the measurement value of the first SSB and the measurement value of the second SSB to the first network device. This is not specifically limited.

Further, after receiving the measurement result reported by the terminal device, the first network device may indicate, based on the measurement result, the terminal device to perform cell handover.

2. For the Problem 2:

After receiving an SSB, a terminal device may determine a frequency domain reference point (Point A) based on a frequency domain position of the SSB. In a 5G communication system, a frequency band width is greatly increased, and flexibility of frequency domain resource allocation is increased. Therefore, a concept of a center frequency is weakened, and the Point A is used as the reference point in frequency domain to allocate a resource. Further, the Point A is a center of a subcarrier 0 of a common resource block (common resource block, CRB). Because different resources in the 5G communication system may use different subcarrier spacings, for example, an SSB and a physical uplink shared channel (physical uplink shared channel, PUSCH) may have different subcarrier spacings, the CRB functions as a ruler and is used to locate these resources.

Figure 9:
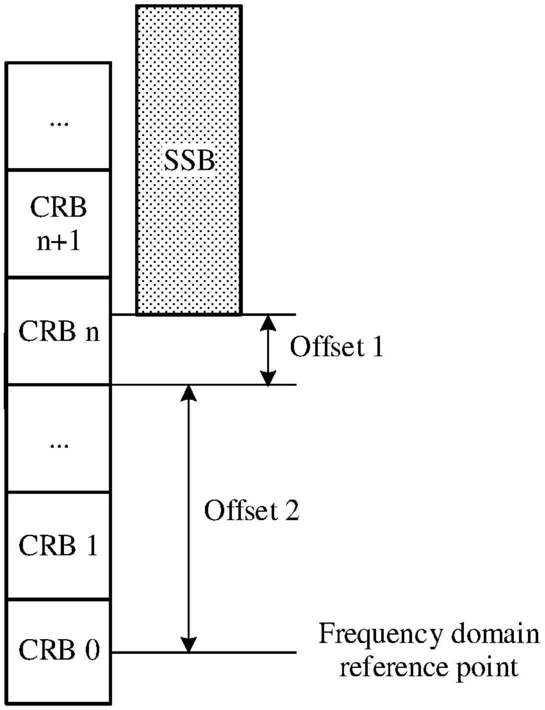
FIG. 9 is a schematic diagram of a frequency domain reference point according to an embodiment of this application.

Refer to FIG. 9. After receiving the SSB, the terminal device may obtain a frequency lower boundary position (Kssb) of the SSB, and then obtain an offset 1 from an ssb-subcarrierOffset field in an MIB, and obtain an offset 2 from an OffsetToPointA field in SIB1. The offset 1 carried in the ssb-subcarrierOffset field indicates a frequency domain offset between a frequency domain lower boundary position of the SSB and a frequency domain lower boundary position of a CRB in which a subcarrier with a smallest subcarrier number to which the SSB is mapped is located, and the offset 2 carried in the OffsetToPointA field is a frequency domain offset between the CRB in which the subcarrier with the smallest subcarrier number to which the SSB is mapped is located and a frequency domain reference point. Further, the terminal device may learn of a position of the Point A based on Kssb and the two offsets, as shown in the following formula:

$$\text{Point } A = Kssb + \text{ssb-subcarrierOffset} + \text{OffsetToPointA}$$

For specific descriptions of ssb-subcarrierOffset and OffsetToPointA, refer to related current technologies. Details are not described herein again.

However, when one cell is associated with two pieces of frequency information, a terminal device 1 may receive SSB #1 based on first frequency information, and a terminal device 2 may receive SSB #5 based on second frequency information, because the two parameters ssb-subcarrierOffset and OffsetToPoint1 in the MIB and SIB1 are shared by a plurality of terminal devices, positions of the Point A calculated by different terminal devices are different. As a result, an error occurs during subsequent resource allocation by the network device.

Based on this, an embodiment of this application provides a method for determining a frequency domain reference point, so that the terminal device can accurately determine the frequency domain reference point.

The following describes, with reference to Embodiment 3, the method for determining the frequency domain reference point provided in this embodiment of this application.

Embodiment 3

A terminal device receives second information from a second network device, where the second information may be carried in a first system message, and the first system message may be SIB1. The second information includes a first offset and a second offset. The first offset is a frequency domain offset between a frequency domain reference point and a first CRB on which a subcarrier with a smallest subcarrier number to which the first SSB is mapped is located. The second offset is a frequency domain offset between the frequency domain reference point and a second CRB on which a subcarrier with a smallest subcarrier number to which the second SSB is mapped is located. For example, SIB1 may include two OffsetToPointA fields, and the two OffsetToPointA fields respectively correspond to different frequency information. For example, the two OffsetToPointA fields are respectively an OffsetToPointA field 1 and an OffsetToPointA field 2. The OffsetToPointA field 1 carries the first offset, and the OffsetToPointA field 2 carries the second offset.

In addition, the terminal device may further receive third information from the second network device, where the third information may be carried in a second system message, and the second system message may be an MIB. The third information includes a third offset and a fourth offset. The third offset is a frequency domain offset between a frequency domain lower boundary position of a first SSB and a frequency domain lower boundary position of a first CRB. The fourth offset is a frequency domain offset between a frequency domain lower boundary position of a second SSB and a frequency domain lower boundary position of a second CRB. For example, the MIB may include two ssb-subcarrierOffset fields, and the two ssb-subcarrierOffset fields respectively correspond to different frequency information. For example, the two ssb-subcarrierOffset fields are respectively an ssb-subcarrierOffset field 1 and an ssb-subcarrierOffset field 2. The ssb-subcarrierOffset field 1 carries the third offset, the ssb-subcarrierOffset field 2 carries the fourth offset.

Further, frequency information of the first SSB is different from frequency information of the second SSB. For example, the frequency information of the first SSB is frequency information 1, and the frequency information of the second SSB is frequency information 2. The first SSB and the second SSB may be associated with a same cell, for example, a first cell. The second information or the third information is sent by the second network device in the first cell.

After determining the first SSB as a serving SSB, the terminal device may determine the frequency domain reference point according to the foregoing formula based on the first offset and the third offset. Alternatively, after determining the second SSB as a serving SSB, the terminal device may determine the frequency domain reference point based on the second offset and the fourth offset. For the first cell, the terminal device receives the first SSB, and establishes time domain synchronization with the first cell based on the first SSB. In this case, it may be understood that the terminal device determines the first SSB as the serving SSB.

For example, there may be a plurality of specific implementations in which the two OffsetToPointA fields respectively correspond to different frequency information and the two ssb-subcarrierOffset fields respectively correspond to different frequency information. The following describes two possible manners by using an example in which the two ssb-subcarrierOffset fields respectively correspond to different frequency information.

Manner 1: The MIB may carry indication information, where the indication information indicates an association relationship between two ssb-subcarrierOffset fields and two pieces of frequency information. For example, an ssb-subcarrierOffset field 1 corresponds to frequency information 1, and an ssb-subcarrierOffset field 2 corresponds to frequency information 2. In this way, after receiving the first SSB based on the frequency information 1, the terminal device may learn, based on the indication information in the MIB, that the frequency information 1 corresponds to the ssb-subcarrierOffset field 1. Further, the third offset carried in the ssb-subcarrierOffset field 1 is used as an offset that should be used to determine the frequency domain reference point.

Manner 2: The network device separately sends respective MIBs based on different frequency information. For example, the network device sends MIB1 based on the frequency information 1, where MIB1 carries the ssb-subcarrierOffset field 1; and sends MIB2 based on the frequency information 2, where MIB2 carries the ssb-subcarrierOffset field 2. In this way, after receiving the first SSB based on the frequency information 1, the terminal device may use the third offset carried in the ssb-subcarrierOffset field 1 in MIB1 as an offset that should be used to determine the frequency domain reference point.

It should be noted that, for a case in which SIB1 carries the OffsetToPointA field, adaptively refer to the foregoing Manner 1 and Manner 2. Details are not described again.

In this embodiment of this application, it is considered that the third offset may be the same as the fourth offset. Therefore, when the third offset is the same as the fourth offset, an existing solution may also be used. To be specific, the MIB includes one ssb-subcarrierOffset field, and an offset carried in the ssb-subcarrierOffset field is shared by a plurality of terminal devices.

For the Foregoing Embodiment 1 to Embodiment 3, it should be Noted that:

(1) The foregoing Embodiment 1 to Embodiment 3 may be separately implemented, or may be implemented in combination. For example, Embodiment 1 and Embodiment 2 may be implemented in combination. For another example, Embodiment 1 or Embodiment 2 may be implemented in combination with Embodiment 3.

① When Embodiment 1 and Embodiment 2 are implemented in combination, for example, the terminal device may reselect the first cell according to the solution in Embodiment 1, and after accessing the first cell, the terminal device may hand over to another cell according to the solution in Embodiment 2.

② When Embodiment 1 and Embodiment 3 are combined for implementation, the first cell in Embodiment 1 and the first cell in Embodiment 3 may be a same cell. For example, when the first cell is a cell on which the terminal device camps, the first network device and the second network device may be a same network device. In this case, when camping on the first cell, the terminal device may perform cell reselection according to the solution in Embodiment 1, and receive the SSB associated with the first cell and determine the frequency domain reference point according to the solution in Embodiment 3. The cell reselection operation and the operation of determining the frequency domain reference point may be performed simultaneously, or may be performed at different moments. This is not specifically limited.

For another example, when the first cell is a neighboring cell of a cell on which the terminal device camps, the first network device and the second network device may be a same network device or may be different network devices. In this case, after reselecting the first cell according to the solution in Embodiment 1, the terminal device may receive the SSB associated with the first cell and determine the frequency domain reference point according to the solution in Embodiment 3.

③ When Embodiment 2 and Embodiment 3 are combined for implementation, the first cell in Embodiment 2 and the first cell in Embodiment 3 may be a same cell. For example, when the first cell is a cell accessed by the terminal device, the first network device and the second network device may be a same network device. In this case, before accessing the first cell, the terminal device may receive the SSB associated with the first cell and determine the frequency domain reference point according to the solution in Embodiment 3; and after accessing the first cell, the terminal device may perform cell handover according to the solution in Embodiment 2.

For another example, when the first cell is a neighboring cell of a cell accessed by the terminal device, the first network device and the second network device may be a same network device or may be different network devices. In this case, the terminal device may hand over to the first cell according to the solution in Embodiment 2, and before handing over to the first cell, the terminal device may receive the SSB associated with the first cell and determine the frequency domain reference point according to the solution in Embodiment 3.

(2) Step numbers in the flowcharts described in Embodiment 1 to Embodiment 3 are merely an example of an execution procedure, and do not constitute a limitation on an execution sequence of the steps. In embodiments of this application, there is no strict execution sequence between steps that do not have a time sequence dependency relationship with each other. In addition, not all the steps shown in the flowcharts are mandatory steps, and some steps may be added to or deleted from the flowcharts according to an actual requirement.

The foregoing mainly describes the solutions provided in embodiments of this application from a perspective of interaction between a network device and a terminal device. It may be understood that, to implement the foregoing functions, the network device or the terminal device may include a corresponding hardware structure and/or a software module for performing each function. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, division into functional units may be performed on the terminal device and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 10:
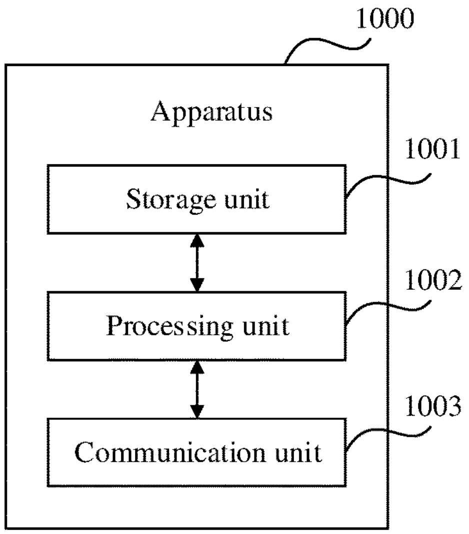
FIG. 10 is a possible schematic block diagram of an apparatus according to an embodiment of this application.

When the integrated unit is used, FIG. 10 is a possible example block diagram of an apparatus according to an embodiment of this application. As shown in FIG. 10, an apparatus 1000 may include a processing unit 1002 and a communication unit 1003. The processing unit 1002 is configured to control and manage an action of the apparatus 1000. The communication unit 1003 is configured to support communication between the apparatus 1000 and another device. Optionally, the communication unit 1003 is also referred to as a transceiver unit, and may include a receiving unit and/or a sending unit, respectively configured to perform a receiving operation and a sending operation. Optionally, the apparatus 1000 may further include a storage unit 1001 that is configured to store program code and/or data of the apparatus 1000.

The apparatus 1000 may be the terminal device in any one of the foregoing embodiments, or may be a chip disposed in the terminal device. The processing unit 1002 may support the apparatus 1000 in performing actions of the terminal device in the foregoing method examples. Alternatively, the processing unit 1002 mainly performs an internal action of the terminal device in the method examples, and the communication unit 1003 may support communication between the apparatus 1000 and a network device. For example, the communication unit 1003 may be configured to perform step 602 in FIG. 6, and step 802 and step 804 in FIG. 8. The processing unit 1002 may be configured to perform step 603 in FIG. 6 and step 803 in FIG. 8.

Specifically, in an embodiment, the communication unit 1003 is configured to receive first information from a first network device, where the first information indicates that a first cell is associated with a first SSB and a second SSB, and frequency information of the first SSB is different from frequency information of the second SSB; and the processing unit 1002 is configured to determine quality information of the first cell based on a measurement value of the first SSB and a measurement value of the second SSB.

In a possible design, the processing unit 1002 is specifically configured to determine the quality information of the first cell based on the measurement value of the first SSB, the measurement value of the second SSB, and the auxiliary parameter, where the auxiliary parameter is obtained by the communication unit 1003 from a first network device, and the auxiliary parameter includes a preset threshold, a coefficient of the measurement value of the first SSB, and a coefficient of the measurement value of the second SSB.

In a possible design, the processing unit 1002 is specifically configured to: if both the measurement value of the first SSB and the measurement value of the second SSB are greater than or equal to the preset threshold, determine the quality information of the first cell based on the coefficient of the measurement value of the first SSB, the coefficient of the measurement value of the second SSB, the measurement value of the first SSB, and the measurement value of the second SSB; and if the measurement value of the first SSB or the measurement value of the second SSB is less than the preset threshold, determine the quality information of the first cell based on a largest measurement value in the measurement value of the first SSB and the measurement value of the second SSB.

In a possible design, the communication unit 1003 is further configured to receive second information from a second network device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible design, the communication unit 1003 is further configured to receive third information from the second network device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible design, the processing unit 1002 is further configured to: after determining the first SSB as a serving SSB, determine the frequency domain reference point based on the first offset and the third offset; or after determining the second SSB as a serving SSB, determine the frequency domain reference point based on the second offset and the fourth offset.

In a possible design, the first cell is a cell on which the terminal device camps; or the first cell is a neighboring cell of a cell on which the terminal device camps.

In a possible design, the first information includes one or more association relationship identifiers and frequency information of an SSB corresponding to each association relationship identifier, where frequency information of the first SSB and frequency information of the second SSB correspond to a same association relationship identifier.

In a possible design, the first information is carried in a system message from the first network device.

In a possible design, the first cell is a cell accessed by the terminal device; or the first cell is a neighboring cell of a cell accessed by the terminal device.

In a possible design, the first information is carried in an RRC reconfiguration message or an RRC resume message from the first network device.

In a possible design, the RRC reconfiguration message or the RRC resume message further includes a measurement event identifier; and the communication unit 1003 is further configured to: if determining that the quality information of the first cell meets a reporting condition corresponding to the measurement event identifier, report the quality information of the first cell to the first network device.

In a possible design, the first information includes frequency information of the first SSB associated with the first cell and frequency information of the second SSB associated with the first cell.

The apparatus 1000 may be the network device (for example, the first network device or the second network device) in any one of the foregoing embodiments, or may be a chip disposed in the network device. The processing unit 1002 may support the apparatus 1000 in performing actions of the network device in the foregoing method examples. Alternatively, the processing unit 1002 mainly performs an internal action of the network device in the method examples, and the communication unit 1003 may support communication between the apparatus 1000 and another device. For example, the communication unit 1003 may be configured to perform step 601 in FIG. 6 and step 801 in FIG. 8.

Specifically, in an embodiment, the processing unit 1002 is configured to determine first information, where the first information indicates that a first cell is associated with a first SSB and a second SSB, and frequency information of the first SSB is different from frequency information of the second SSB; and the communication unit 1003 is configured to send the first information to a terminal device, where the first information is used to determine quality information of the first cell.

In a possible design, the communication unit 1003 is further configured to send second information to the terminal device, where the second information includes a first offset and a second offset, the first offset is a frequency domain offset between a frequency domain reference point and a first CRB on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

In a possible design, the communication unit 1003 is further configured to send third information to the terminal device, where the third information includes a third offset and a fourth offset, the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

In a possible design, the first information includes one or more association relationship identifiers and frequency information of an SSB corresponding to each association relationship identifier, where frequency information of the first SSB and frequency information of the second SSB correspond to a same association relationship identifier.

In a possible design, the first information includes frequency information of the first SSB associated with the first cell and frequency information of the second SSB associated with the first cell.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in the processor element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of the integrated circuits. For another example, when the unit in the apparatus is implemented by scheduling a program by a processing element, the processing element may be a processor, for example, a central processing unit (CPU) or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a manner of a chip, the sending unit is an interface circuit that is of the chip and that is configured to send a signal from another chip or apparatus.

Figure 11:
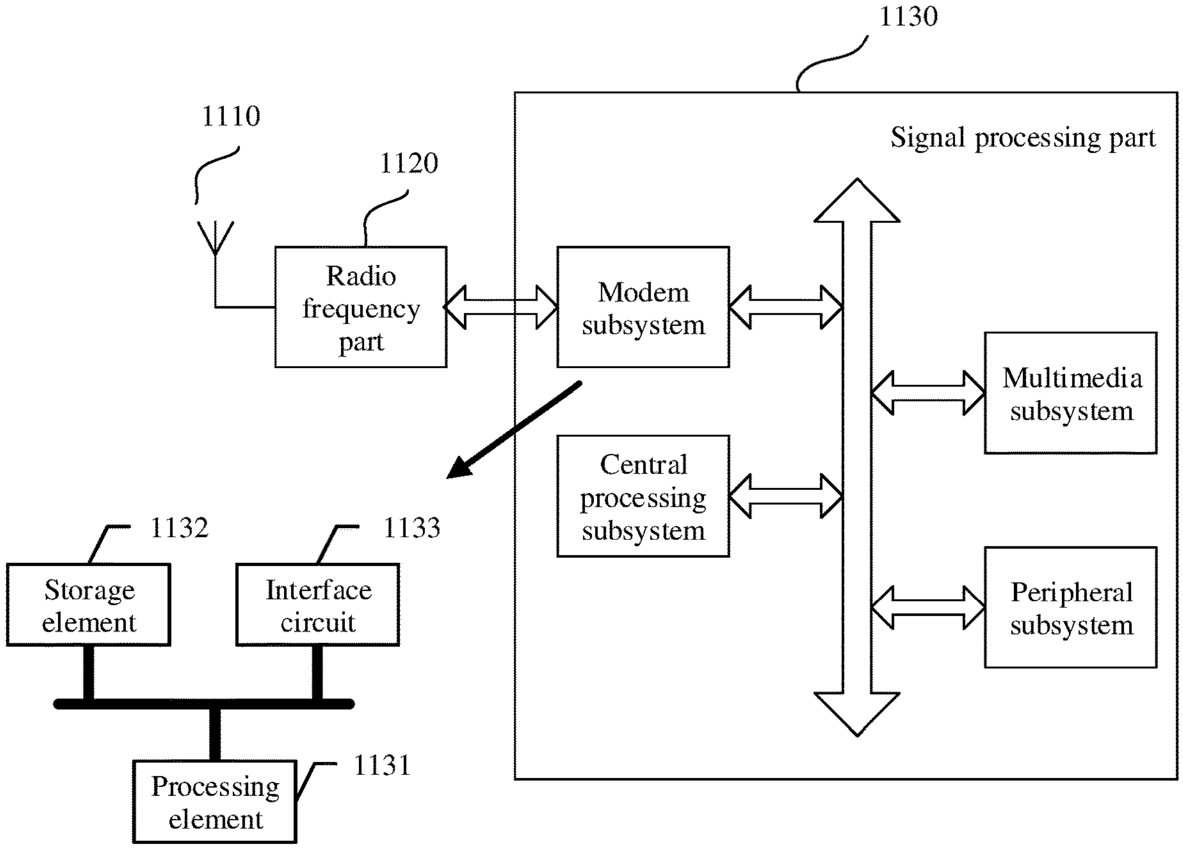
FIG. 11 is a schematic diagram of a structure of a terminal device according to an embodiment of this application.

FIG. 11 is a schematic diagram of a structure of a terminal device according to an embodiment of this application. The terminal device may be the terminal device in the foregoing embodiments, and may be configured to implement operations of the terminal device in the foregoing embodiments. As shown in FIG. 11, the terminal device includes an antenna 1110, a radio frequency part 1120, and a signal processing part 1130. The antenna 1110 is connected to the radio frequency part 1120. In a downlink direction, the radio frequency part 1120 receives, by using the antenna 1110, information sent by a network device; and sends, to the signal processing part 1130 for processing, the information sent by the network device. In an uplink direction, the signal processing part 1130 processes information of the terminal device, and sends the information of the terminal device to the radio frequency part 1120. The radio frequency part 1120 processes the information of the terminal device, and then sends processed information to the network device through the antenna 1110.

The signal processing part 1130 may include a modem subsystem, configured to process data at each communication protocol layer. The signal processing part 1130 may further include a central processing subsystem, configured to process an operating system and an application layer that are of the terminal device. In addition, the signal processing part 1130 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a chip that is separately disposed.

The modem subsystem may include one or more processing elements 1131, for example, include one main control CPU and another integrated circuit. In addition, the modem subsystem may further include a storage element 1132 and an interface circuit 1133. The storage element 1132 is configured to store data and a program. However, a program used to perform the methods performed by the terminal device in the foregoing methods may not be stored in the storage element 1132, but is stored in a memory outside the modem subsystem, and is loaded and used by the modem subsystem when to be used. The interface circuit 1133 is configured to communicate with another subsystem.

The modem subsystem may be implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated together to form a chip.

Units of the terminal device that implement the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods that are provided in the foregoing method embodiments and performed by the terminal device. The processing element may perform, in a first manner, to be specific, by invoking the program stored in the storage element, some or all steps performed by the terminal device; or may perform, in a second manner, to be specific, by using a hardware integrated logic circuit in the processor element in combination with instructions, some or all steps performed by the terminal device; or may certainly perform, by combining the first manner and the second manner, some or all steps performed by the terminal device.

The processing element herein is the same as that described above, and may be implemented by using a processor. A function of the processing element may be the same as a function of the processing unit described in FIG. 10. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 10. The storage element may be implemented by using a memory. A function of the storage element may be the same as a function of the storage unit described in FIG. 10. The storage element may be one memory, or an umbrella term of a plurality of memories.

The terminal device shown in FIG. 11 can implement the processes related to the terminal device in the method embodiments shown in FIG. 6 or FIG. 8. Operations and/or functions of the modules in the terminal device shown in FIG. 11 are intended to implement the corresponding procedures in the foregoing method embodiments. For details, refer to the descriptions in the foregoing method embodiments. To avoid repetition, detailed descriptions are properly omitted herein.

Figure 12:
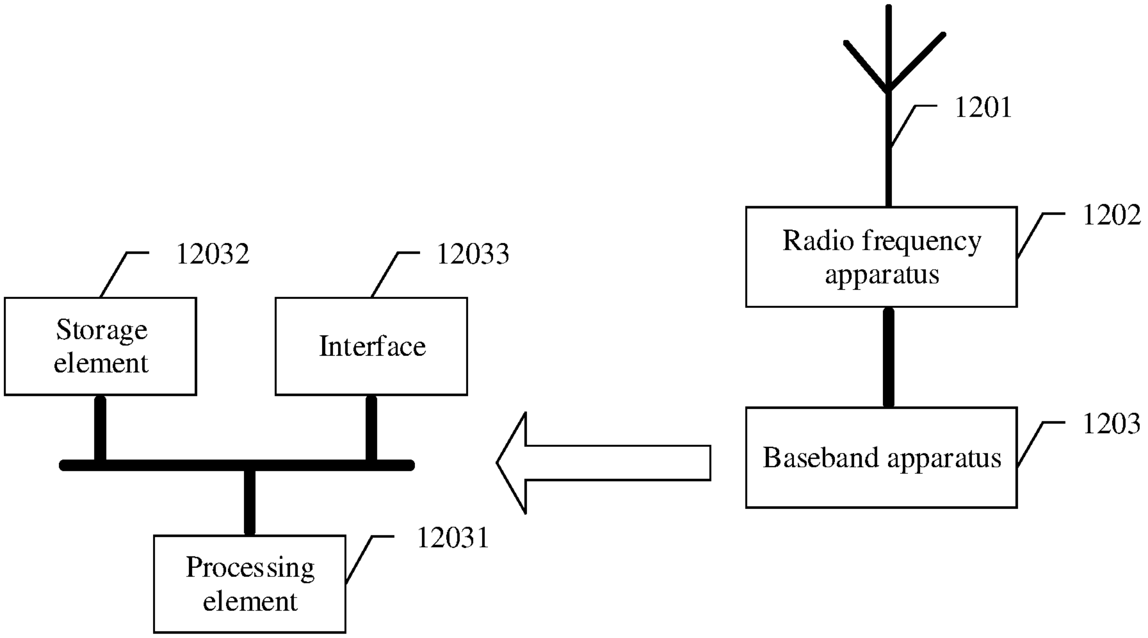
FIG. 12 is a schematic diagram of a structure of a network device according to an embodiment of this application.

FIG. 12 is a schematic diagram of a structure of a network device according to an embodiment of this application. The network device is configured to implement the operations of the network device (for example, the first network device or the second network device) in the foregoing embodiments. As shown in FIG. 12, the network device includes an antenna 1201, a radio frequency apparatus 1202, and a baseband apparatus 1203. The antenna 1201 is connected to the radio frequency apparatus 1202. In an uplink direction, the radio frequency apparatus 1202 receives, by using the antenna 1201, information sent by a terminal device; and sends, to the baseband apparatus 1203 for processing, the information sent by the terminal device. In a downlink direction, the baseband apparatus 1203 processes information from the terminal device and sends processed information to the radio frequency apparatus 1202, and the radio frequency apparatus 1202 processes the information from the terminal device and then sends processed information to the terminal device by using the antenna 1201.

The baseband apparatus 1203 may include one or more processing elements 12031, for example, include one main control CPU and another integrated circuit. In addition, the baseband apparatus 1203 may further include a storage element 12032 and an interface 12033. The storage element 12032 is configured to store a program and data. The interface 12033 is configured to exchange information with the radio frequency apparatus 1202. The interface is, for example, a common public radio interface (CPRI). The foregoing apparatus applied to the network device may be located in the baseband apparatus 1203. For example, the foregoing apparatus applied to the network device may be a chip in the baseband apparatus 1203. The chip includes at least one processing element and an interface circuit. The processing element is configured to perform steps in any method performed by the network device. The interface circuit is configured to communicate with another apparatus. In an implementation, units in the network device for implementing the steps in the foregoing methods may be implemented in a form of scheduling a program by the processing element. For example, the apparatus used in the network device includes a processing element and a storage element. The processing element invokes a program stored in the storage element, to perform the method performed by the network device in the foregoing method embodiments. The storage element may be a storage element on the same chip as the processing element, that is, an on-chip storage element; or may be a storage element that is on a different chip from the processing element, that is, an off-chip storage element.

In another implementation, units of the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated together to form a chip.

The units in the network device for implementing the steps in the foregoing methods may be integrated together, and implemented in a form of a system-on-a-chip (SOC). For example, the baseband apparatus includes the SOC chip, and is configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods that are provided in the foregoing method embodiments and performed by the network device. The processing element may perform, in a first manner, to be specific, by invoking the program stored in the storage element, some or all steps performed by the network device; or may perform, in a second manner, to be specific, by using a hardware integrated logic circuit in the processor element in combination with instructions, some or all steps performed by the network device; or may certainly perform, by combining the first manner and the second manner, some or all steps performed by the network device.

The processing element herein is the same as that described above, and may be implemented by using a processor. A function of the processing element may be the same as a function of the processing unit described in FIG. 10. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 10. The storage element may be implemented by using a memory. A function of the storage element may be the same as a function of the storage unit described in FIG. 10. The storage element may be one memory, or an umbrella term of a plurality of memories.

The network device shown in FIG. 12 can implement the processes related to the network device in the method embodiments shown in FIG. 6 or FIG. 8. Operations and/or functions of the modules in the network device shown in FIG. 12 are intended to implement the corresponding procedures in the foregoing method embodiments. For details, refer to the descriptions in the foregoing method embodiments. To avoid repetition, detailed descriptions are properly omitted herein.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, device (system), and computer program product according to this application. It should be understood that computer program instructions may be used to implement each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A method, applied to a terminal device, the method comprising:

receiving first information from a first network device, wherein the first information indicates that a first cell is associated with a first synchronization signal and physical broadcast channel block (SSB) and a second SSB, and frequency information of the first SSB is different from frequency information of the second SSB; and determining quality information of the first cell based on a measurement value of the first SSB and a measurement value of the second SSB, wherein determining the quality information of the first cell based on the measurement value of the first SSB and the measurement value of the second SSB comprises:

determining the quality information of the first cell based on the measurement value of the first SSB, the measurement value of the second SSB, and an auxiliary parameter, wherein the auxiliary parameter is obtained from the first network device, and the auxiliary parameter comprises a preset threshold, a coefficient of the measurement value of the first SSB, and a coefficient of the measurement value of the second SSB, the threshold is used to determine whether combination calculation is able to be performed on the measurement value of the first SSB and the measurement value of the second SSB, the coefficient of the measurement value of the first SSB is a weight when the measurement value of the first SSB participates in combination calculation on the measurement value of the first SSB and the measurement value of the second SSB, and the coefficient of the measurement value of the second SSB is a weight when the measurement value of the second SSB participates in combination calculation on the measurement value of the first SSB and the measurement value of the second SSB; and wherein determining the quality information of the first cell based on the measurement value of the first SSB, the measurement value of the second SSB, and the auxiliary parameter comprises:

when both the measurement value of the first SSB and the measurement value of the second SSB are greater than or equal to the preset threshold, determining the quality information of the first cell based on the coefficient of the measurement value of the first SSB, the coefficient of the measurement value of the second SSB, the measurement value of the first SSB, and the measurement value of the second SSB; and when the measurement value of the first SSB or the measurement value of the second SSB is less than the preset threshold, determining the quality information of the first cell based on a largest measurement value in the measurement value of the first SSB and the measurement value of the second SSB.

2. The method according to claim 1, further comprising:

receiving second information from a second network device, wherein the second information comprises a first offset and a second offset, and wherein the first offset is a frequency domain offset between a frequency domain reference point and a first common resource block (CRB) on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

3. The method according to claim 2, further comprising:

receiving third information from the second network device, wherein the third information comprises a third offset and a fourth offset, and wherein the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

4. The method according to claim 3, further comprising:

after determining the first SSB to be a serving SSB, determining the frequency domain reference point based on the first offset and the third offset.

5. The method according to claim 1, wherein:

the first cell is a cell on which the terminal device camps; or the first cell is a neighboring cell of a cell on which the terminal device camps.

6. The method according to claim 5, wherein the first information comprises one or more association relationship identifiers and frequency information of an SSB corresponding to each association relationship identifier of the one or more association relationship identifiers, and wherein frequency information of the first SSB and frequency information of the second SSB correspond to a same association relationship identifier.

7. The method according to claim 5, wherein the first information is carried in a system message from the first network device.

8. The method according to claim 5, wherein the first information comprises frequency information of the first SSB associated with the first cell and frequency information of the second SSB associated with the first cell.

9. The method according to claim 1, wherein:

the first cell is a cell accessed by the terminal device; or the first cell is a neighboring cell of a cell accessed by the terminal device.

10. The method according to claim 9, wherein the first information is carried in a radio resource control (RRC) reconfiguration message or an RRC resume message from the first network device.

11. The method according to claim 10, wherein the RRC reconfiguration message or the RRC resume message further comprises a measurement event identifier; and wherein the method further comprises:

when determining that the quality information of the first cell meets a reporting condition corresponding to the measurement event identifier, reporting the quality information of the first cell to the first network device.

12. A method, applied to a network device, the method comprising:

determining first information, wherein the first information comprises an indication that a first cell is associated with a first synchronization signal and physical broadcast channel block (SSB) and a second SSB, frequency information of the first SSB, and frequency information of the second SSB, and wherein the frequency information of the first SSB is different from the frequency information of the second SSB; and sending the first information and an auxiliary parameter to a terminal device, wherein the auxiliary parameter comprises a preset threshold, a coefficient of a measurement value of the first SSB, and a coefficient of a measurement value of the second SSB, and wherein the first information and the auxiliary parameter are used to determine quality information of the first cell, the threshold is used to determine whether combination calculation is able to be performed on the measurement value of the first SSB and the measurement value of the second SSB, the coefficient of the measurement value of the first SSB is a weight when the measurement value of the first SSB participates in combination calculation on the measurement value of the first SSB and the measurement value of the second SSB, and the coefficient of the measurement value of the second SSB is a weight when the measurement value of the second SSB participates in combination calculation on the measurement value of the first SSB and the measurement value of the second SSB; and wherein the first information further comprises one or more association relationship identifiers and frequency information of an SSB corresponding to each association relationship identifier of the one or more association relationship identifiers, and wherein the frequency information of the first SSB and the frequency information of the second SSB correspond to a same association relationship identifier.

13. The method according to claim 12, further comprising:

sending second information to the terminal device, wherein the second information comprises a first offset and a second offset, and wherein the first offset is a frequency domain offset between a frequency domain reference point and a first common resource block (CRB) on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

14. The method according to claim 12, further comprising:

sending third information to the terminal device, wherein the third information comprises a third offset and a fourth offset, and wherein the third offset is a frequency domain offset between a frequency domain lower boundary position of the first SSB and a frequency domain lower boundary position of a first common resource block (CRB), and the fourth offset is a frequency domain offset between a frequency domain lower boundary position of the second SSB and a frequency domain lower boundary position of a second CRB.

15. An apparatus, comprising:

one or more processors; and one or more non-transitory memories coupled to the one or more processors and storing programming instructions that are executable by the one or more processors to cause the apparatus to perform operations comprising:

receiving first information from a first network device, wherein the first information indicates that a first cell is associated with a first synchronization signal and physical broadcast channel block (SSB) and a second SSB, and frequency information of the first SSB is different from frequency information of the second SSB; and determining quality information of the first cell based on a measurement value of the first SSB and a measurement value of the second SSB, wherein determining the quality information of the first cell based on the measurement value of the first SSB and the measurement value of the second SSB comprises:

determining the quality information of the first cell based on the measurement value of the first SSB, the measurement value of the second SSB, and an auxiliary parameter, wherein the auxiliary parameter is obtained from the first network device, and the auxiliary parameter comprises a preset threshold, a coefficient of the measurement value of the first SSB, the threshold is used to determine whether combination calculation is able to be performed on the measurement value of the first SSB and the measurement value of the second SSB, and a coefficient of the measurement value of the second SSB, the coefficient of the measurement value of the first SSB is a weight when the measurement value of the first SSB participates in combination calculation on the measurement value of the first SSB and the measurement value of the second SSB, and the coefficient of the measurement value of the second SSB is a weight when the measurement value of the second SSB participates in combination calculation on the measurement value of the first SSB and the measurement value of the second SSB; and wherein determining the quality information of the first cell based on the measurement value of the first SSB, the measurement value of the second SSB, and the auxiliary parameter comprises:

when both the measurement value of the first SSB and the measurement value of the second SSB are greater than or equal to the preset threshold, determining the quality information of the first cell based on the coefficient of the measurement value of the first SSB, the coefficient of the measurement value of the second SSB, the measurement value of the first SSB, and the measurement value of the second SSB; and when the measurement value of the first SSB or the measurement value of the second SSB is less than the preset threshold, determining the quality information of the first cell based on a largest measurement value in the measurement value of the first SSB and the measurement value of the second SSB.

16. The apparatus according to claim 15, wherein the programming instructions are executable by the one or more processors to cause the apparatus to perform operations further comprising:

receiving second information from a second network device, wherein the second information comprises a first offset and a second offset, and wherein the first offset is a frequency domain offset between a frequency domain reference point and a first common resource block (CRB) on which a subcarrier with a smallest subcarrier number to which the first SSB is mapped is located, and the second offset is a frequency domain offset between the frequency domain reference point and a second CRB on which a subcarrier with a smallest subcarrier number to which the second SSB is mapped is located.

17. The apparatus according to claim 16, wherein the programming instructions are executable by the one or more processors to cause the apparatus to perform operations further comprising:

receiving third information from the second network device, wherein the third information comprises a third offset and a fourth offset, and wherein the third offset is a frequency domain offset between a frequency domain lower boundary position of the first SSB and a frequency domain lower boundary position of the first CRB, and the fourth offset is a frequency domain offset between a frequency domain lower boundary position of the second SSB and a frequency domain lower boundary position of the second CRB.

18. The method according to claim 3, further comprising:

after determining the second SSB to be a serving SSB, determining the frequency domain reference point based on the second offset and the fourth offset.

19. The apparatus according to claim 15, wherein:

the first cell is a cell on which the terminal device camps.

20. The apparatus according to claim 15, wherein:

the first cell is a neighboring cell of a cell on which the terminal device camps.

* * * * *